United States Patent
Kim et al.

(10) Patent No.: US 8,971,272 B2
(45) Date of Patent: Mar. 3, 2015

(54) ADAPTIVE FEEDBACK FOR MULTI-CELL COOPERATIVE COMMUNICATION AND AN ADAPTIVE TRANSMISSION MODE DETERMINING METHOD AND DEVICE

(75) Inventors: Kijun Kim, Anyang-si (KR); Byounghoon Kim, Anyang-si (KR); Hyungyeol Lee, Seoul (KR); Jinbae Park, Incheon (KR); Mingyu Kang, Seoul (KR); Youngseob Choi, Anyang-si (KR); Kwangsoon Kim, Seoul (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 271 days.

(21) Appl. No.: 13/643,500
(22) PCT Filed: May 9, 2011
(86) PCT No.: PCT/KR2011/003431
§ 371 (c)(1),
(2), (4) Date: Oct. 25, 2012
(87) PCT Pub. No.: WO2011/145824
PCT Pub. Date: Nov. 24, 2011

(65) Prior Publication Data
US 2013/0039326 A1 Feb. 14, 2013

Related U.S. Application Data
(60) Provisional application No. 61/346,003, filed on May 18, 2010, provisional application No. 61/346,004, filed on May 18, 2010.

(30) Foreign Application Priority Data
Sep. 7, 2010 (KR) .................. 10-2010-0087437

(51) Int. Cl.
H04B 7/06 (2006.01)
H04B 7/02 (2006.01)
H04B 7/04 (2006.01)

(52) U.S. Cl.
CPC .............. *H04B 7/024* (2013.01); *H04B 7/0456* (2013.01); *H04B 7/0626* (2013.01); *H04B 7/0632* (2013.01); *H04B 7/0639* (2013.01)
USPC .......................................... 370/329; 375/267

(58) Field of Classification Search
CPC ...... H04B 7/024; H04B 7/0456; H04B 7/046; H04B 7/0626; H04B 7/0632; H04B 7/0639
USPC ........................... 370/329; 375/259, 267, 295
See application file for complete search history.

(56) References Cited

U.S. PATENT DOCUMENTS

2008/0292013 A1* 11/2008 Varadarajan et al. ......... 375/260
(Continued)

OTHER PUBLICATIONS

Qualcomm, "Precoded RS for link adaptation: performance gains in CSG deployments", Oct. 12, 2009, 3GPP TSG-RAN WG1 #58bis, R1-094219, pp. 1-7.*
(Continued)

*Primary Examiner* — Paul H Masur
(74) *Attorney, Agent, or Firm* — McKenna Long & Aldridge LLP

(57) ABSTRACT

The present description relates to a method of using a terminal to adaptively feed back channel information relating to multi-cell cooperative communication includes: measuring an average signal-to-noise ratio of a virtual multi-antenna channel between a terminal and at least one cell to transmit same to a base station; receiving, from a base station, a number of allowable feedback bits determined on the basis of the average signal-to-noise ratio and cooperative communication information; selecting a codebook from a plurality of predetermined codebooks on the basis of the number of allowable feedback bits and the cooperative communication information; and quantizing channel information on a virtual multi-antenna channel using the selected codebook, and transmitting feedback information including the quantized channel information to a base station. The codebook may be selected to transmit the feedback information using the entire number of allowable feedback bits.

15 Claims, 15 Drawing Sheets

(56) References Cited

U.S. PATENT DOCUMENTS

| | | |
|---|---|---|
| 2010/0027697 A1* | 2/2010 | Malladi et al. ............... 375/260 |
| 2010/0035555 A1 | 2/2010 | Bala et al. |
| 2010/0104033 A1 | 4/2010 | Gorokhov |
| 2010/0238824 A1* | 9/2010 | Farajidana et al. ........... 370/252 |
| 2010/0248737 A1* | 9/2010 | Smith ....................... 455/452.2 |
| 2010/0309998 A1* | 12/2010 | Jung et al. .................... 375/260 |
| 2010/0322176 A1* | 12/2010 | Chen et al. ................... 370/329 |
| 2011/0002406 A1* | 1/2011 | Ming et al. .................... 375/260 |
| 2011/0249637 A1* | 10/2011 | Hammarwall et al. ....... 370/329 |
| 2011/0249712 A1* | 10/2011 | Hammarwall et al. ....... 375/220 |
| 2012/0134275 A1* | 5/2012 | Choi et al. .................... 370/241 |
| 2012/0300654 A1* | 11/2012 | Gan et al. ..................... 370/252 |

OTHER PUBLICATIONS

NTT DoCoMo, "Views on Scalable CSI Feedback for DL CoMP in LTE-Advanced", Oct. 12, 2009, 3GPP TSG RAN WG1 Meeting #58bis, R1-094243, pp. 1-5.*

A. Papadogiannis, et al., "Decentralising multicell cooperative processing: A novel robust framework", EURASIP Journal on Wireless Communications and Networking, vol. 2009, 2009.02.

J.H. Kim, et al., "Efficient feedback via subspace-based channel quantization for distributed cooperative antenna systems with temporally correlated channels", EURASIP Journal on Advances in Signal Processing, vol. 2008, 2008.01.

* cited by examiner

FIG. 2
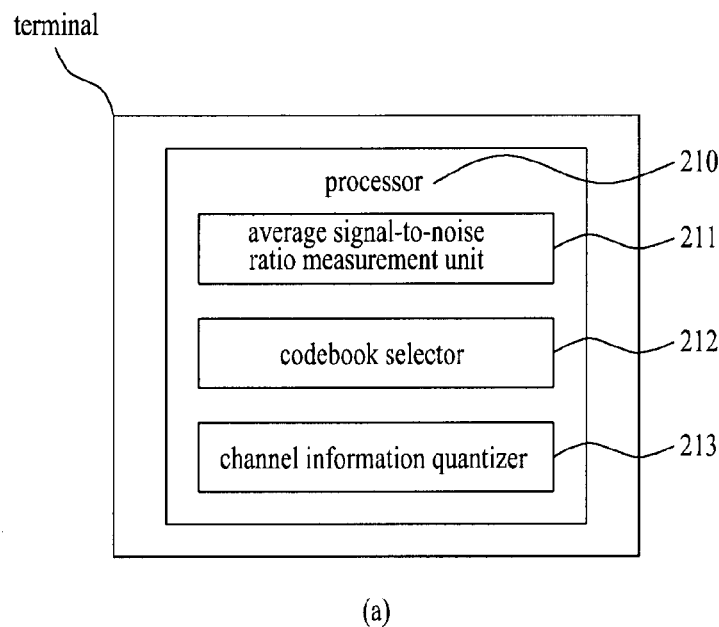
(a)
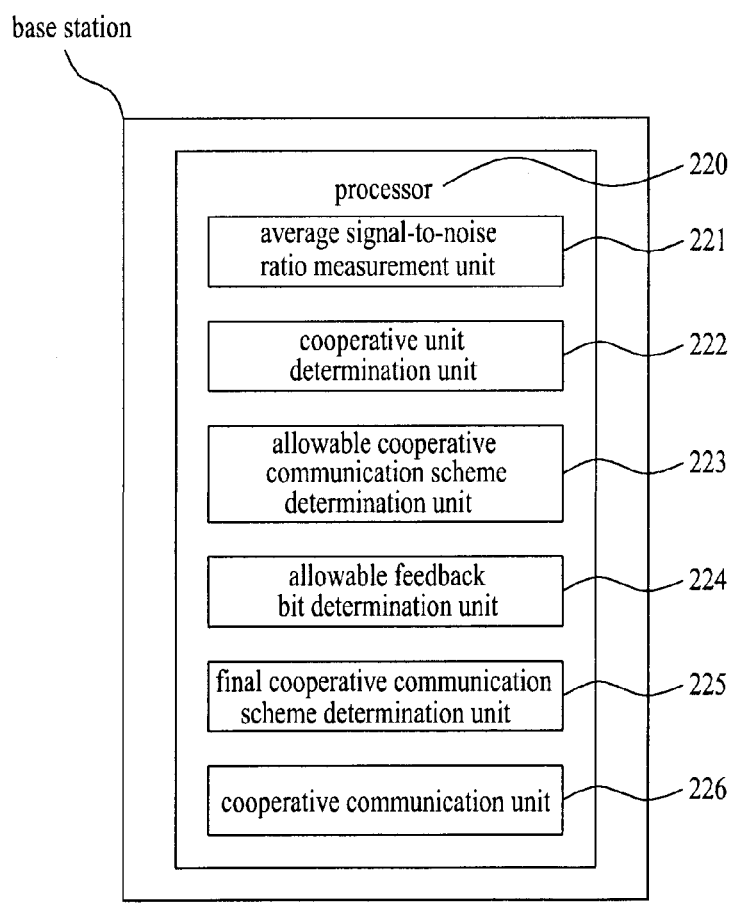
(b)

FIG. 5
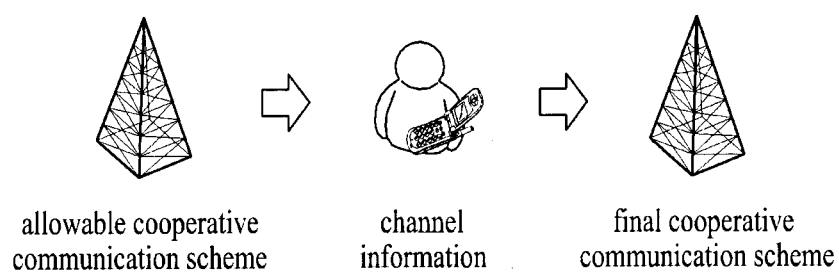
allowable cooperative      channel          final cooperative
communication scheme      information      communication scheme
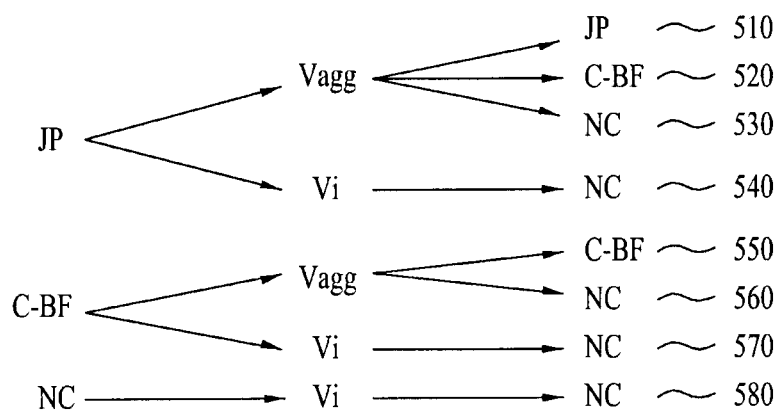

FIG. 6

(a) | Codebook indicator | $Q(V^{eff}_{agg(1,2,3)}, \Sigma^{eff}_{agg(1,2,3)}, \Sigma^{eff}_{agg(1,2)}, \Sigma^{eff}_{agg(1,3)}, \Sigma^{eff}_1, rank(H_{agg(1,2,3)}) | N_{CQ})$ (b) | Codebook indicator | $Q(V^{eff}_{agg(1,2,3)}, \Sigma^{eff}_{agg(1,2,3)}, \Sigma^{eff}_1, rank(H_{agg(1,2,3)}) | N_{CQ})$ (c) | Codebook indicator | $Q(V^{eff}_{agg(1,2)}, \Sigma^{eff}_{agg(1,2)}, \Sigma^{eff}_1, rank(H_{agg(1,2)}) | N_{CQ})$ (d) | Codebook indicator | $Q(V^{eff}_1, \Sigma^{eff}_1, rank(H_1) | N_{CQ})$

FIG. 9
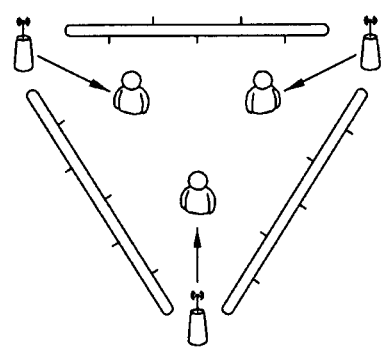
(a)
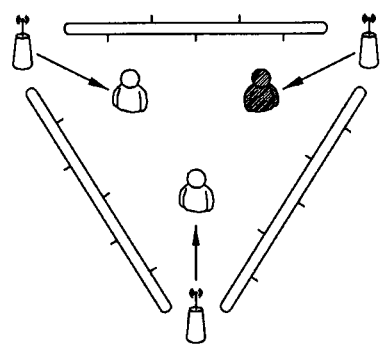
(b)
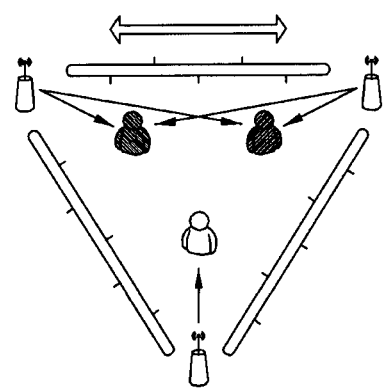
(c)
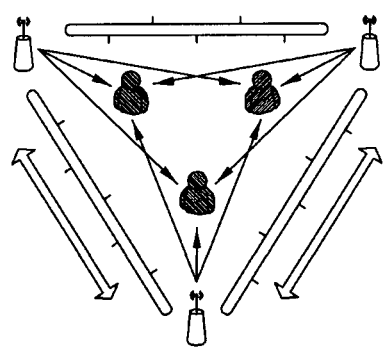
(d)
non-cooperative terminal    cooperative terminal

ADAPTIVE FEEDBACK FOR MULTI-CELL COOPERATIVE COMMUNICATION AND AN ADAPTIVE TRANSMISSION MODE DETERMINING METHOD AND DEVICE This application is a 35 U.S.C. §371 National Stage entry of International Application No. PCT/KR2011/003431, filed May 9, 2011, and claims the benefit to and of U.S. Provisional Application Nos. 61/346,003, filed May 18, 2010, 61/346,004, filed May 18, 2010, and Korean Application No: 10-2010-0087437, filed Sep. 7, 2010, all of which are incorporated by reference in their entirety herein.

TECHNICAL FIELD

The following description relates to wireless communication and more specifically, to adaptive feedback for multi-cell cooperative communication and an adaptive transmission mode determination method and device.

BACKGROUND ART

Multiple Input Multiple Output (MIMO) increases the efficiency of data transmission and reception using multiple transmit antennas and multiple receive antennas. A receiver receives data through multiple paths when multiple antennas are used, whereas the receiver receives data through a single antenna path when a single antenna is used. Accordingly, MIMO can increase a data transmission rate and throughput and improve coverage.

Research on Coordinated Multi-Point (CoMP) for improving throughput of a UE located at a cell boundary by applying improved MIMO to a multi-cell environment is actively performed. The CoMP system can decrease inter-cell interference in a multi-cell environment and improve system performance. CoMP schemes include joint processing (JP) which groups multiple neighboring cells into one group and performs joint processing on the neighboring cells by regarding the cell group as a virtual MIMO system, and cooperative beamforming (C-BF) for solving inter-cell interference by adjusting beam patterns among neighboring cells.

It is necessary for cooperative base stations to obtain feedback information on virtual multi-antenna channels generated between the base stations and UEs belonging to a cooperative group to effectively improve CoMP performance.

DISCLOSURE

Technical Problem

In feedback of channel information from a UE to a base station (BS) in the CoMP system, the BS can determine an optimized cooperative transmission scheme according to channel environment, which can improve system performance. However, the currently discussed CoMP scheme does not provide a method by which a UE adaptively provides feedback of channel information and a BS adaptively determines a cooperative communication scheme according to system environment.

Accordingly, an object of the present invention is to provide adaptive channel information feedback and an adaptive cooperative transmission mode determination method and device.

The technical problems solved by the present invention are not limited to the above technical problems and those skilled in the art may understand other technical problems from the following description.

Technical Solution

According to one aspect of the present invention, a method of adaptively feeding back, by a terminal, channel information relating to multi-cell cooperative communication includes: measuring average signal-to-noise ratios of virtual multi-antenna channels between the terminal and one or more cell to transmit the same to a base station; receiving, from a base station, a number of allowable feedback bits determined on the basis of the average signal-to-noise ratios and cooperative communication information; selecting a codebook from a plurality of predetermined codebooks on the basis of the number of allowable feedback bits and the cooperative communication information; and quantizing channel information on the virtual multi-antenna channels using the selected codebook, and transmitting feedback information including the quantized channel information to the base station, wherein the codebook is selected to transmit the feedback information using the entire number of allowable feedback bits.

According to another aspect of the present invention, a method for adaptively determining, by a base station, a multi-cell cooperative communication scheme includes: receiving average signal-to-noise ratios of virtual multi-antenna channels between a terminal and one or more cells from the terminal; determining a number of allowable feedback bits and cooperative communication information on the basis of the average signal-to-noise ratios; receiving feedback information on the virtual multi-antenna channels from the terminal; and determining a cooperative communication scheme on the basis of the feedback information, wherein the feedback information includes channel information on the virtual multi-antenna channels, which is quantized using a codebook selected from a plurality of predetermined codebooks on the basis of the number of allowable feedback bits and the cooperative communication information, wherein the codebook is selected to transmit the feedback information using the entire number of allowable feedback bits.

According to another aspect of the present invention, a terminal for adaptively feeding back channel information relating to multi-cell cooperative communication includes: a reception module for receiving a downlink signal from a base station; a transmission module for transmitting an uplink signal to the base station; and a processor for controlling the terminal including the reception module and the transmission module, wherein the processor is configured to receive, from the base station, a number of allowable feedback bits and cooperative communication information through the reception module, to select a codebook from a plurality of predetermined codebooks on the basis of the number of allowable feedback bits and the cooperative communication information, to quantize channel information on virtual multi-antenna channels between the terminal and one or more cells using the selected codebook, and to transmit feedback information including the quantized channel information to the base station, wherein the codebook is selected to transmit the feedback information using the entire number of allowable feedback bits.

According to another aspect of the present invention, a base station for adaptively determining a multi-cell cooperative communication scheme includes: a reception module for receiving an uplink signal from a terminal; a transmission module for transmitting a downlink signal to the terminal; and a processor for controlling the base station including the reception module and the transmission module, wherein the processor is configured to receive, from the terminal, average signal-to-noise ratios of virtual multi-antenna channels between the terminal and one or more cell through the reception module, to determine a number of allowable feedback bits and cooperative communication information on the basis of the average signal-to-noise ratios, to transmit the number of allowable feedback bits and cooperative communication information to the terminal through the transmission module, to receive feedback information on the virtual multi-antenna channels from the terminal through the reception module, and to determine a cooperative communication scheme on the basis of the feedback information, wherein the feedback information includes channel information on the virtual multi-antenna channels, which is quantized using a codebook selected from a plurality of predetermined codebooks on the basis of the number of allowable feedback bits and the cooperative communication information, wherein the codebook is selected to transmit the feedback information using the entire number of allowable feedback bits.

The following can be commonly applied to the above embodiments of the present invention.

The codebook may be selected in such a manner that a low resolution codebook is selected when the number of cells relating to the channel information is large and a high resolution codebook is selected when the number of cells relating to the channel information is small.

The cooperative communication information may include information on a cooperative unit and an allowable cooperative communication scheme.

The codebook may be configured such that quantized channel information about a lower cooperative communication scheme is acquired from quantized channel information about a higher cooperative communication scheme.

The channel information on the virtual multi-antenna channels between the terminal and one or more cells may be simultaneously quantized.

The feedback information may include a codebook indicator.

The base station may determine the cooperative communication scheme by sharing the feedback information with other base stations in the cooperative unit.

According to another aspect of the present invention, a method of adaptively feeding back, by a terminal, channel information relating to multi-cell cooperative communication includes: receiving a pilot signal from a base station; estimating virtual multi-antenna channels between the terminal and one or more cells and transmitting first channel state information to the base station; receiving a request for second channel state information from the base station; and transmitting the second channel state information to the base station, wherein the second channel state information has higher accuracy than the first channel state information.

According to another aspect of the present invention, a method of adaptively determining, by a base station, a multi-cell cooperative communication scheme includes: transmitting a pilot signal to a terminal; receiving first channel state information on virtual multi-antenna channels between the terminal and one or more cells; transmitting a request for second channel state information to the terminal; receiving the second channel state information from the terminal; and determining a cooperative communication scheme and terminals which will perform cooperative communication on the basis of the second channel state information, wherein the second channel state information has higher accuracy than the first channel state information.

According to another aspect of the present invention, a terminal for adaptively feeding back channel information relating to multi-cell cooperative communication includes: a reception module for receiving a downlink signal from a base station; a transmission module for transmitting an uplink signal to the base station; and a processor for controlling the terminal including the reception module and the transmission module, wherein the processor is configured to receive a pilot signal from the base station through the reception module, to estimate virtual multi-antenna channels between the terminal and one or more cells using the pilot signal, to transmit first channel state information to the base station through the transmission module, to receive a request for second channel state information from the base station through the reception module, and to transmit the second channel state information to the base station through the transmission module, wherein the second channel state information has higher accuracy than the first channel state information.

According to another aspect of the present invention, a base station for adaptively determining a multi-cell cooperative communication scheme includes: a reception module for receiving an uplink signal from a terminal; a transmission module for transmitting a downlink signal to the terminal; and a processor for controlling the base station including the reception module and the transmission module, wherein the processor is configured to transmit a pilot signal to the terminal through the transmission module, to receive first channel state information on virtual multi-antenna channels between the terminal and one or more cells through the reception module, to transmit a request for second channel state information to the terminal through the transmission module, to receive the second channel state information from the terminal through the reception module, and to determine a cooperative communication scheme and terminals which will perform cooperative communication on the basis of the second channel state information, wherein the second channel state information has higher accuracy than the first channel state information.

The following can be commonly applied to the embodiments of the present invention.

The first channel state information may be generated using a low level bit part of a codebook and the second channel state information may be generated using a high level bit part of the codebook.

Information on a subband for feeding back the first channel state information may be transmitted or received through a downlink control signal when the pilot signal is transmitted or received.

Information on a subband for feeding back the second channel state information and channel information on a neighboring cell may be transmitted or received through a downlink control signal when the second channel state information request is transmitted or received.

One or more terminals to be requested to transmit the second channel state information may be determined using the first channel state information.

The technical problems solved by the present invention are not limited to the above technical problems and those skilled in the art may understand other technical problems from the following description.

Advantageous Effects

According to embodiment of the present invention, it is possible to provide a method and device for providing adaptive channel information feedback without increasing feedback overhead. Furthermore, a cooperative communication scheme suitable for a system environment can be adaptively determined.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.
In the drawings:

FIG. 2 is a functional block diagram of a processor for controlling a terminal device and a processor for controlling a base station device according to an embodiment of the present invention;

FIG. 5 is a view for explaining scenarios of determining a final cooperative communication scheme when the adaptive channel information feedback scheme is used;

FIG. 6 illustrates exemplary feedback signals from a terminal when the adaptive channel information feedback scheme is used;

FIG. 9 illustrates determination of a cooperative unit for cooperative transmission;

BEST MODE

Figure 1:
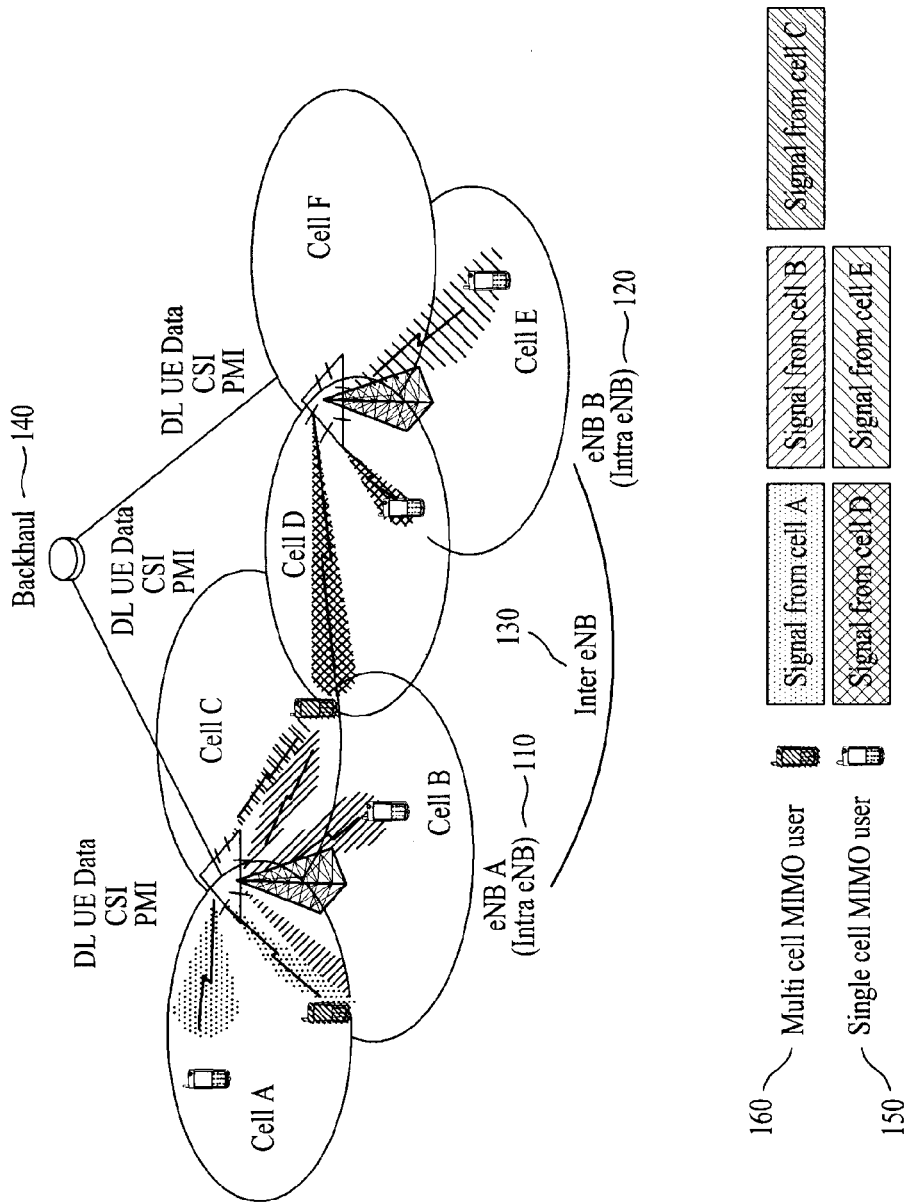
FIG. 1 is a conceptual diagram illustrating a CoMP process of an intra eNB and an inter eNB.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (Wireless-MAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

CoMP System

A CoMP system will now be described with reference to FIG. 1. FIG. 1 is a conceptual diagram illustrating a CoMP operation of an intra eNB and an inter eNB.

Referring to FIG. 1, intra eNBs 110 and 120 and an inter eNB 130 are present in a multi-cell environment. In an LTE system, an intra eNB includes several cells (or sectors). Cells belonging to an eNB which includes a specific terminal correspond to intra eNBs 110 and 120 for the specific terminal. That is, cells sharing the same eNB to which the specific UE belongs correspond to the intra eNBs 110 and 120 and cells belonging to other eNBs correspond to the inter eNB 130. Cells based on the same eNB to which a specific UE belongs transmit/receive information (e.g. data, channel state information (CSI)) through an x2 interface, whereas cells based on different eNBs exchange information through a backhaul 140. As shown in FIG. 1, a single cell MIMO user 150 located in a single cell may communicate with one serving eNB in one cell (sector), and a multi-cell MIMO user 160 located at a cell boundary may communicate with a plurality of serving eNBs in multiple cells (sectors).

The CoMP system improves throughput of a UE located at a cell boundary by adopting improved MIMO transmission in a multi-cell environment. The CoMP system can reduce inter-cell interference in the multi-cell environment. For example, CoMP transmission schemes may include JP which groups multiple neighboring cells into one group and performs joint processing on the neighboring cells by regarding the cell group as a virtual MIMO system, such as zero-forcing beamforming, block diagonalization, etc. and C-BF for solving an inter-cell interference problem by adjusting a beam pattern among neighboring cells.

A terminal can receive data from multi-cell base stations using the CoMP system. Furthermore, the base stations can simultaneously support one or more terminals using the same radio frequency resource, to thereby improve system performance. In addition, the base stations can perform space division multiple access (SDMA) on the basis of channel state information between the base stations and terminals.

In the CoMP system, a serving base station and one or more cooperative base stations are connected to a scheduler through a backbone network. The scheduler may operate by receiving feedback channel information on channel states between each terminal and cooperative base stations, measured by each base station, through the backbone network. For example, the scheduler can schedule information for cooperative MIMO operation, for the serving base station and one or more cooperative base stations. That is, the scheduler can directly instruct each base station to perform cooperative MIMO operation.

As described above, the CoMP system groups a plurality of neighboring cells into one group and regards the cell group as a virtual MIMO system. The CoMP system may adopt MIMO using multiple antennas.

MIMO includes an open-loop scheme that does not use feedback information transmitted from a receiver and a closed-loop scheme that uses the feedback information from the receiver. According to the closed-loop scheme, the receiver can transmit feedback information on a channel state to a transmitter such that the transmitter checks the channel state through the feedback information, and thus wireless communication system performance can be improved. The closed-loop MIMO system uses a precoding technique by which the transmitter processes data using feedback information on a channel on which the data is transmitted, which is transmitted from the receiver, thereby minimizing the influence of the channel.

The precoding technique includes a codebook based precoding scheme and a precoding scheme of quantizing channel information and feeding back the quantized channel information.

According to the codebook based precoding scheme, the receiver selects a precoding matrix from a codebook previously shared by the receiver and the transmitter and feeds back the index of the selected precoding matrix to the transmitter. Then, the transmitter transforms transmission data using the precoding matrix. Since feedback of all channel information increases system overhead, the codebook based precoding scheme can reduce system overhead by feeding back only a codebook based index to the transmitter. Specifically, feedback channel information is quantized, a codebook is generated using the quantized channel information, and indexes are respectively allocated to precoding matrices included in the codebook. The receiver and the transmitter share the codebook, and thus the receiver feeds back only an index to the transmitter so as to reduce system overhead.

The CoMP system can also use the codebook based precoding scheme such that the receiver (terminal) feeds back channel information to the transmitter (base station) in a multi-cell environment.

Specifically, for effective operation of the CoMP system, it is necessary to feed back, from the terminal to the base station, information such as precoding matrix indexes (PMIs) of virtual multi-antenna channels generated between cooperative base stations and terminals belonging to a cooperative group, a signal-to-noise ratio (SNR) (or signal-to-interference plus noise ratio (SINR)) of each stream, and the number of pieces of data which can be transmitted (rank information).

A scheme of extending the conventional channel information feedback scheme used in the conventional single-cell communication, that is, a scheme by which the terminal quantizes channel information on channels between the terminal and cooperative base stations using a single codebook, which uses a fixed number of bits for representing a PMI, SNR and rank of a channel between the terminal and one base station, and feeds back the quantized channel information to corresponding base stations (e.g. 3GPP LTE contributions R1-094243, etc.) may be considered as a scheme by which the terminal feeds back channel information necessary for CoMP operation. This scheme may require the terminal to additionally quantize information on a phase difference between PMIs of channels between the terminal and base stations and to feed back the quantized information.

For example, when the terminal feeds back an SNR and inter-cell interference information to base stations, neighboring base stations can determine a cooperative unit and a cooperative communication scheme using the feedback information and transmit the determination result to the terminal. The terminal can quantize channel information on channels between the terminal and cooperative base stations using a single codebook, which uses a fixed number of bits for representing a PMI, SNR and rank of a channel between the terminal and one base station, on the basis of the information transmitted from the base stations, additionally quantize a phase difference between PMIs of channels between the terminal and the base stations if required, and feed back the quantized channel information and the additionally quantized information to the base stations. Accordingly, the base stations can perform multi-cell cooperative communication using the feedback information from the terminal.

The aforementioned channel information feedback scheme is a simple expansion of the conventional channel feedback scheme used in the conventional single-cell communication, and thus the channel information feedback scheme is inefficient because of low performance. For example, since the terminal independently quantizes information on channels between the terminal and base stations only using a single codebook which uses a fixed number of bits for representing a PMI, SNR and rank of a channel between the terminal and one base station without considering a cooperative unit and cooperative communication scheme determined by the base stations, performance is not high.

Therefore, an embodiment of the present invention proposes a scheme by which a plurality of codebooks, which use a flexible number of bits necessary to represent a PMI, an SNR and a rank within the number of allowable feedback bits, are generated in advance, a terminal and a base station share the codebooks, and the terminal selects a most suitable codebook on the basis of a cooperative unit and a cooperative communication scheme determined by the base station, quantizes channel information necessary for multi-cell cooperative communication using the selected codebook and feeds back the quantized channel information to the base station, thereby improving performance while decreasing feedback overhead. In this case, the terminal simultaneously quantizes channel information on virtual multi-antenna channels generated between the terminal and cooperative base stations, distinguished from the conventional scheme of independently quantizing channel information on channels between the terminal and cooperative base stations, and thus overhead of additional feedback of information on a phase difference between PMIs can be reduced. This will be described in detail below.

A scheduler of a base station needs to consider distribution of users (terminals) and the number of bits of quantized feedback channel information in order to select an appropriate cooperative transmission scheme.

As a scheme of determining an efficient cooperative transmission scheme, a scheme of using feedback from a terminal using a single level codebook can be considered (e.g. 3GPP LTE contribution R1-094219, etc.). According to this scheme, while a base station and a terminal share the single level codebook, the base station can transmit a reference signal (or pilot signal) to the terminal, and the terminal can estimate a channel using the reference signal, quantize channel information on a selected subband and feed back the quantized channel information to the base station using a single-level quantization bit. The base station can determine a cooperative transmission mode, perform terminal scheduling using the feedback information from the terminal and transmit data to the terminal. The terminal can transmit acknowledgement (ACK/NACK) information regarding the data transmitted from the base station.

According to the aforementioned cooperative transmission scheme determination method, the number of quantization bits for feedback of the terminal is restricted in practice, and thus the number of subbands selected by one terminal may be limited. Considering that channel information having very high accuracy needs to be transmitted to guarantee satisfactory performance when cooperative terminals using a cooperative transmission scheme feed back channel information on measured channels, restriction on the number of feedback bits may obstruct utilization of frequency selective properties. Accordingly, a scheme capable of using frequency selective properties is needed.

Furthermore, according to the aforementioned cooperative transmission scheme determination method, it may be difficult to effectively operate cooperative transmission schemes selectable by the base station according to circumstance. For example, according to single-level codebook based feedback, the base station may obtain a transmission rate higher than an actually attainable transmission rate in calculation of an estimated transmission rate of JP. Accordingly, the base station may select JP as a cooperative transmission scheme even when C-BF or no-cooperation (NC) scheme is more efficient in practice. That is, selection of a cooperative transmission scheme for efficient transmission may result in inefficient transmission result. Therefore, selection of an adaptive multi-cell cooperative transmission mode is required according to circumstance.

Accordingly, another embodiment of the present invention suggests a scheme of selecting a cooperative transmission mode that maximizes proportional fairness of terminals and selecting terminals operating according to cooperative transmission. According to this scheme, the feedback overhead problem can be solved using a multi-level codebook capable of distributing the quantity of feedback, frequency selective properties can be utilized, and a cooperative transmission mode suitable for circumstance can be adaptively selected, which will be described in detail below.

Adaptive Channel Information Feedback

A description will be given of an adaptive channel information feedback scheme for multi-cell cooperative communication in a multi-cell communication system.

FIG. 2(a) is a functional block diagram of a processor 210 which controls a terminal according to an embodiment of the present invention and FIG. 2(b) is a functional block diagram of a processor 220 which controls a base station according to an embodiment of the present invention.

Referring to FIG. 2(a), the processor 210 of the terminal may include an average signal-to-noise ratio (SNR) measurement unit 211, a codebook selector 212 and a channel information quantizer 213.

The average SNR measurement unit 211 can measure average SNRs from neighboring cell base stations (including a serving cell) and feed back the average SNRs to the base station. The base station can determine a cooperative unit, an allowable cooperative communication scheme and the number of allowable feedback bits using the feedback information from the terminal. For example, a neighboring cell having a high average SNR, measured by the terminal, can be grouped into the same cooperative unit including the serving cell and a cooperative communication scheme suitable for the cooperative unit can be used, to thereby effectively overcome interference and improve performance.

The codebook selector 212 can select a most suitable codebook from a plurality of codebooks which are generated in advance and shared by the terminal and the base station. The terminal is assigned the number of allowable feedback bits by the base station and transmits feedback to the base station using the number of allowable feedback bits. When the terminal transmits the feedback to the base station using the entire allowable feedback bits, the codebook selector 212 can select a codebook most suitable for the cooperative unit and the allowable cooperative communication scheme. The codebook selector 212 can transmit a codebook selection result to the channel information quantizer 213 and the base station.

The channel information quantizer 213 can quantize corresponding channel information using the codebook selected by the codebook selector 212 to generate information to be fed back to the base station.

The terminal may include a reception module, a transmission module, a memory and an antenna in addition to the processor 210. The reception module may receive signals, data, and information from the base station. The transmission module may transmit signals, data and information to the base station. The terminal may include a plurality of antennas. In addition to the above-mentioned function, the processor may be configured to control the overall operation of the terminal including the reception module, transmission module, memory and antenna. Furthermore, the processor 210 may process information received by the terminal and information to be transmitted from the terminal. The memory may store the processed information for a predetermined time and may be replaced with a component such as a buffer (not shown).

Referring to FIG. 2(*b*), the processor 220 of the base station may include an average SNR storage unit 221, a cooperative unit determination unit 222, an allowable cooperative communication scheme determination unit 223, an allowable feedback bit determination unit 224, a final cooperative communication scheme determination unit 225, and a cooperative communication unit 226.

The average SNR storage unit 221 can store average SNRs from cells, measured and fed back by the terminal, and transmit the average SNRs to the cooperative unit determination unit 222, the allowable cooperative communication scheme determination unit 223 and the allowable feedback bit determination unit 224.

The cooperative unit determination unit 222 can determine an appropriate cooperative unit by exchanging the average SNRs with neighboring base station. The cooperative unit determination unit 222 can signal the determined cooperative unit to the terminal.

The allowable cooperative communication scheme determination unit 223 can determine an allowable cooperative communication scheme, which can be performed by cells in the cooperative unit, by taking the average SNRs fed back from the terminal and system environment (backhaul latency, etc.) into account. The determined allowable cooperative communication scheme may be signaled to the terminal. For example, if data for computations performed between cells and channel information are easily exchanged between the cells through the backhaul (140 of FIG. 1), a higher cooperative communication scheme such as JP can be selected as the allowable cooperative communication scheme. However, in the case in which only channel information can be exchanged between cells due to relative large backhaul latency, system performance may be deteriorated if a cooperative communication scheme such as JP is adopted. In this case, C-BF can be selected as the allowable cooperative communication scheme. If information cannot be exchanged between cells due to remarkably large backhaul latency, NC can be selected as the allowable cooperative communication scheme (i.e. a cooperative communication scheme may not be used).

The allowable feedback bit determination unit 224 can determine the number of allowable feedback bits that can be used for the terminal to quantize channel information and to feed back the quantized channel information on the basis of the average SNRs and system and channel environments. The determined number of allowable feedback bits can be transmitted to the base station. For example, the number of allowable feedback bits can be increased if channel information feedback overhead is low due to good uplink radio resource conditions and channel environment whereas the number of allowable feedback bits can be decreased if not. In this manner, the number of allowable feedback bits can be adaptively determined according to system and channel environments.

The final cooperative communication scheme determination unit 225 can select a final cooperative communication scheme on the basis of the channel information quantized and fed back by the terminal and the system environment and signal the final cooperative communication scheme to the cooperative communication performing unit 226. Here, the base station may select the above-mentioned allowable cooperative communication scheme or a lower cooperative communication scheme. For example, C-BF or NC, which is a lower cooperative communication scheme, can be performed when data exchange for JP is not easy due to large backhaul latency even if the terminal has quantized channel information necessary for JP and fed back the channel information to the base station. In addition, a lower cooperative communication scheme can be performed when some terminals belonging to a cooperative cell do not perform channel estimation and thus cannot use channel information although a system environment condition for performing JP is satisfied. To determine the cooperative communication scheme, it is necessary to obtain channel information required for a lower cooperative communication scheme from feedback channel information required for a higher cooperative communication scheme. In this case, additional feedback for performing the lower cooperative communication scheme need not be performed. Accordingly, a codebook needs to be generated such that the channel information necessary for the lower cooperative communication scheme can be obtained from the feedback channel information necessary for the higher cooperative communication scheme.

The cooperative communication performing unit 226 can perform cooperative communication according to the final cooperative communication scheme determined by the final cooperative communication scheme determination unit 225.

The base station may include a reception module, a transmission module, a memory and an antenna in addition to the processor 220. The reception module may receive signals, data, and information from the terminal. The transmission module may transmit signals, data and information to the terminal. The base station may include a plurality of antennas. In addition to the above-mentioned function, the processor 220 may be configured to control the overall operation of the base station including the reception module, transmission module, memory and antenna. Furthermore, the processor 220 may process information received by the base station and information to be transmitted from the base station. The memory may store the processed information for a predetermined time and may be replaced with a component such as a buffer (not shown).

Figure 3:
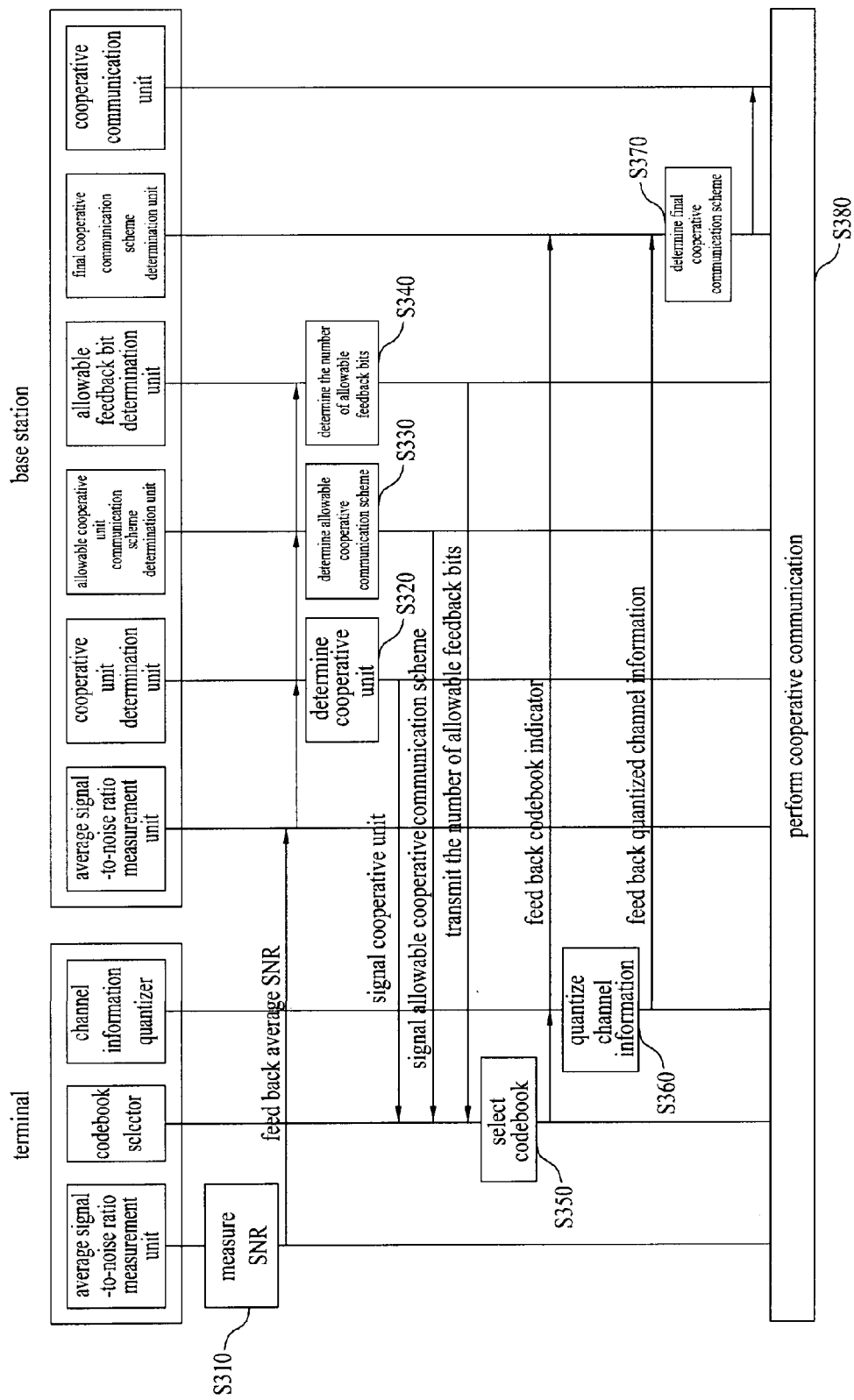
FIG. 3 is a flowchart illustrating an adaptive channel information feedback scheme for CoMP according to an embodiment of the present invention.

FIG. 3 is a flowchart illustrating an adaptive channel information feedback scheme for multi-cell cooperative communication according to an embodiment of the present invention. Functional modules of a terminal and a base station, shown in FIG. 3, correspond to the functional modules of the processors 210 and 220 shown in FIG. 2, and thus description thereof is omitted.

The terminal can measure average SNRs of channels between the terminal and detectable cells (including a serving cell and neighboring cells) and feed back the average SNRs to the base station (S310). A neighboring base station may determine a cooperative unit, an allowable cooperative communication scheme and the number of allowable feedback bits on the basis of the system environment by exchanging the average SNRs fed back from the terminal through a backhaul and transmit the determination result to the terminal (S320, S330 and S340).

The cooperative unit refers to a set of cells which simultaneously perform a cooperative communication scheme. The allowable cooperative communication scheme refers to a highest cooperative communication scheme that can be supported by the cells in the cooperative unit based on system environment. Here, a final cooperative communication scheme may include cooperative communication schemes lower than the allowable cooperative communication scheme. If data and channel information are smoothly exchanged between cells since a backhaul connected between base stations by wire has a large capacity, it is effective to determine a higher cooperative communication scheme such as JP as the allowable cooperative communication scheme. If not, C-BF or NC can be determined as the allowable cooperative communication scheme.

For example, if three neighboring cells belong to a cooperative unit, the allowable cooperative communication scheme can be determined as follows. When up to JP can be supported as a cooperative communication scheme on the basis of SNRs fed back from terminals and the system environment, 3JP (all the three cells perform JP) can be determined as the allowable cooperative communication scheme if the three cells greatly interfere one another, whereas 2JP+1NC (two cells perform JP and one cell performs NC) can be determined as the allowable cooperative communication scheme if two cells considerably interfere each other and one cell hardly interferes with the two cells. When up to C-BF can be supported as a cooperative communication scheme on the basis of the SNRs fed back from terminals and the system environment, 3C-BF (all three cells perform C-BF) can be determined as the allowable cooperative communication scheme if the three cells remarkably interfere one another, whereas 2C-BF+1NC (two cells perform C-BF and one cell performs NC) can be determined as the allowable cooperative communication scheme if two cells considerably interfere with each other and one cell is less interfered with. Otherwise, if the three cells hardly interfere one another irrespective of whether JP or C-BF is supported, 3NB (all the three cells perform NC) can be determined as the allowable cooperative communication scheme.

Upon reception of the determination result as to the cooperative unit, allowable cooperative communication scheme and the number of allowable feedback bits from the base station, the terminal can select a codebook (S350). A plurality of codebooks is predefined and the terminal and the base station share the codebooks. The terminal can select a codebook which is most suitable for the cooperative unit and the allowable communication scheme when all feedback bits are used. Information on the selected codebook may be used for channel information quantization of the terminal and determination of a final cooperative communication scheme of the base station.

The plurality of codebooks may be predefined as codebooks that can simultaneously quantize channel information on virtual multi-antenna channels generated between cooperative cells on the basis of the number of allowable feedback bits that can be normally used, the number of cooperative cells that can be normally generated, and the number of transmit/receive antennas that can be normally used.

The terminal can quantize corresponding channel information on the basis of the selected codebook and feed back the quantized channel information with information on the selected codebook to the base station (S360). The average number of feedback bits necessary for feedback of the quantized channel information can be reduced to thereby decrease system overhead.

Furthermore, in order to decrease the number of bits necessary for feedback of the information on the selected codebook from the terminal to the base station, it is possible to select a minimum number of codebooks suitable for the corresponding system environment, select a codebook from the minimum number of codebooks, and quantize the channel information based on the selected codebook.

In the conventional single codebook based feedback scheme, the number of bits of feedback information on multi-antenna channels generated between the terminal and a plurality of cells may be greater than the number of bits of feedback information on a multi-antenna channel generated between the terminal and a single cell, and the number of bits of feedback information on a higher cooperative communication scheme may be greater than the number of bits of feedback information on a lower cooperative communication scheme. That is, the number of bits of feedback information can vary with the number of cells included in a cooperative unit and a cooperative communication scheme, and system overhead can increase since information on a phase difference between cells may be additionally needed.

However, according to the feedback scheme based on a plurality of codebooks according to the present invention, the terminal can be configured not to additionally provide inter-cell phase difference information while using the number of allowable feedback bits, determined by the base station. That is, the terminal can use a low resolution codebook for quantization of channel information necessary for a high cooperative communication scheme and use a high resolution codebook for quantization of channel information necessary for a low cooperative communication scheme. For example, if three cells belong to a cooperative unit and the number of allowable feedback bits is $N_{CQ}$ a terminal can select a codebook (e.g., low resolution codebook) that can be used to quantize virtual multi-antenna channels generated between the terminal and base stations of the three cells using the entire allowable feedback bits $N_{CQ}$ when the allowable cooperative communication scheme is 3JP or 3C-BF. When the cooperative communication scheme is 2JP+1NC or 2C-BF+1NC, a terminal corresponding to 2JP or 2C-BF can select a codebook (e.g. middle resolution codebook) that can be used to quantize virtual multi-antenna channels generated between the terminal and base stations of two cells related to the terminal using the all allowable feedback bits $N_{CQ}$, whereas a terminal corresponding to 1NC can select a codebook (e.g. high resolution codebook) that can be used to quantize a virtual multi-antenna channel generated between the terminal and a serving cell using all allowable feedback bits $N_{CQ}$ When the cooperative communication scheme is 3NC, each terminal can select a codebook (e.g. high resolution codebook) that can be used to quantize a virtual multi-antenna channel generated between the terminal and the serving cell using all allowable feedback bits $N_{CQ}$.

In other words, the base station can assign a predetermined number of allowable feedback bits to the terminal. For example, the number of allowable feedback bits can be 30. However, the number of allowable feedback bits is not limited thereto and can vary according to system state. The terminal can feed back information on virtual MIMO channels while using the number of allowable feedback bits assigned by the base station. In this case, while the number of virtual MIMO channels may vary according to the number of cells belonging to the cooperative unit, the terminal can feed back the channel information while persistently using the number of allowable feedback bits. The relationship between the number of cells belonging to the cooperative unit and the number of channel information feedback bits is described below.

For example, 10-bit (10 bits×3=30 bits) feedback information can be generated per cell in case of feedback of channel information about three cells, 15-bit (15 bits×2=30 bits) feedback information can be generated per cell in case of feedback of channel information about two cells, and 30 bits can be used for feedback for one cell in case of feedback of channel information about one cell. That is, since all allowable feedback bits are used, the number of channel information feedback bits necessary for a large number of cells can be decreased using a low resolution codebook in case of feedback of information about channels relating to the large number of cells, whereas the number of channel information feedback bits necessary for a small number of cells can be increased using a high resolution codebook in case of feedback of information about channels relating to the small number of cells. That is, codebook resolution decreases as the number of cells belonging to the cooperative unit (the number of cells that require channel information feedback) increases.

While only the number of cells belonging to the cooperative unit has been considered as a standard of selection of a codebook in the above description, it is possible to select a most suitable codebook on the basis of the allowable cooperative communication scheme as well as the cooperative unit.

The aforementioned feedback scheme by which the terminal quantizes channel information corresponding to the cooperative unit and the allowable cooperative communication scheme using a most suitable codebook (that can use all the allowable feedback bits assigned by the base station) can improve performance over the conventional feedback scheme in which a terminal independently quantizes multi-antenna channels between the terminal and base stations using a single codebook, additionally quantizes inter-cell phase difference information if required, and feeds back the quantized information.

Furthermore, according to the feedback scheme based on the plurality of codebooks, the terminal can quantize channel information using a suitable codebook according to the current channel environment. For example, if a terminal to which JP is assigned as an allowable cooperative communication scheme fails in channel estimation for some cells in the current cooperative unit, the terminal can adopt a codebook that can be used to quantize channel information on cooperative cells relating to successful channel estimation most effectively. Accordingly, base stations in the cooperative unit can determine a final cooperative communication scheme by exchanging information on the selected codebook and channel information fed back from the terminal on the basis of the system environment (S370) and perform cooperative communication according to the determined final cooperative communication scheme (S380).

Figure 4:
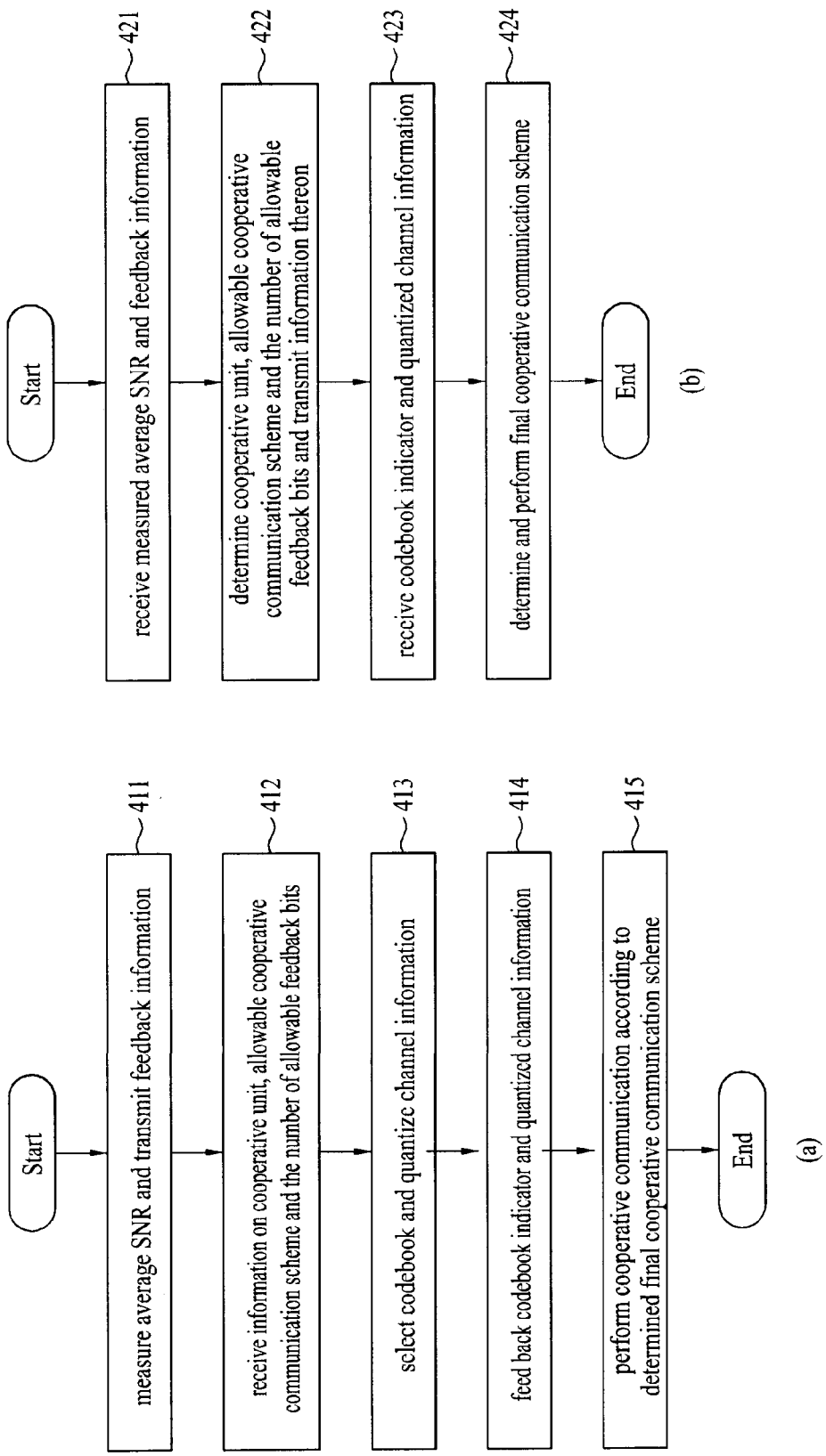
FIG. 4 is a flowchart illustrating operations of a terminal and a base station which perform cooperative communication using adaptive channel information feedback.

FIG. 4(a) is a flowchart illustrating operations of a terminal performing cooperative communication using adaptive channel information feedback.

The terminal may measure an average SNR and feed back channel information to a base station (S411). The terminal may receive information on a cooperative unit, an allowable cooperative communication scheme and the number of allowable feedback bits, which are determined by the base station (S412). The terminal may select an appropriate codebook from a plurality of codebooks on the basis of the information received in step S412 and quantize corresponding channel information using the selected codebook (S413). Here, the terminal can select a codebook which is most suitable for the cooperative unit, the allowable cooperative communication scheme and the current channel environment when all allowable feedback bits are used from the plurality of codebooks which are predefined and shared by the terminal and the base station. The terminal may feed back information on the selected codebook and the quantized channel information to the base station (S414). The terminal may be notified of a final cooperative communication scheme determined by the base station and perform cooperative communication according to the final cooperative communication scheme (S415).

FIG. 4(b) is a flowchart illustrating operations of a base station performing cooperative communication using adaptive channel information feedback.

Each of base stations in the cooperative unit may receive average SNRs measured by terminals and feedback channel information from the terminals (S421). The base station may determine a cooperative unit, an allowable cooperative communication scheme and the number of allowable feedback bits and transmit the determination result to the terminals (S422). The base station may receive information on a codebook selected by each terminal from a plurality of codebooks, which are predefined and shared by the base stations and terminals, and quantized channel information from the terminal (S423). The base stations in the cooperative unit may determine a final cooperative communication scheme by exchanging information on selected codebooks and the quantized channel information, received from the terminals on the basis of system environments, signal the determined final cooperative communication scheme to the terminals and perform cooperative communication according to the final cooperative communication scheme.

FIG. 5 illustrates scenarios which can determine a final cooperative communication scheme when the adaptive channel information feedback scheme is used.

As described above, the base stations in the cooperative unit can determine the number of allowable feedback bits and the allowable cooperative communication scheme on the basis of average SNRs fed back from terminals and system environment (backhaul latency) and transmit the determination result to the terminals. Here, if the number of allowable feedback bits is $N_{CQ}$ and the allowable cooperative communication scheme is JP, when a terminal successfully performs channel estimation for all or some base stations in the cooperative unit, the terminal can select a codebook most suitable to quantize channel information on virtual multi-antenna channels between the terminal and base stations relating to successful channel estimation using $N_{CQ}$, quantize the channel information, and feed back the quantized channel information and information on the selected codebook to the base stations. In this case, the channel information is information on the virtual multi-antenna channels between the terminal and multiple cells and may be represented as Vagg. The base stations in the cooperative unit can determine a final cooperative communication scheme by exchanging the feedback information from terminals on the basis of the system environment. For example, JP can be selected as the final cooperative communication scheme when conditions for JP are all satisfied (510), C-BF can be selected as the final cooperative communication scheme when data exchange for JP is difficult to perform between cells due to large backhaul latency (520), and NC can be selected as the final cooperative communication scheme when data exchange for performing C-BF is not allowed due to severe backhaul latency or channel information on some cells in the cooperative unit cannot be estimated (530). When the terminal fails channel estimation for base stations in the cooperative unit while successfully performing channel estimation for a serving base station, the terminal can select a codebook most suitable to quantize a multi-antenna channel generated between the terminal and the serving base station using $N_{CQ}$, quantize information on the channel, and feed back the quantized channel information and information on the selected codebook to the base stations. In this case, the channel information is information on a multi-antenna channel between the terminal and a base station of a single cell and may be represented as Vi. Here, the base station can determine the final cooperative communication scheme for the terminal as NC (540).

It is assumed that the base stations in the cooperative unit determine that the number of allowable feedback bits is $N_{CQ}$ and the allowable cooperative communication scheme is C-BF and transmit the determination result to terminals. When a terminal successfully performs channel estimation for all or some base stations in the cooperative unit, the terminal can select a codebook most suitable to quantize information on virtual multi-antenna channels between the terminal and base stations relating to successful channel estimation using $N_{CQ}$, quantize the corresponding channel information, and feed back the quantized channel information and information on the selected codebook to the base stations. In this case, the channel information is information on virtual multi-antenna channels between the terminal and multiple cells and may be represented as Vagg. The base stations in the cooperative unit can determine a final cooperative communication scheme by exchanging the feedback information from the terminal on the basis of the system environment. For example, C-BF can be selected as the final cooperative communication scheme when conditions for C-BF are all satisfied (550), and NC can be selected as the final cooperative communication scheme when data exchange for C-BF is difficult to perform due to severe backhaul latency or channel information on some cells in the cooperative unit cannot be estimated (560). When the terminal fails channel estimation for base stations in the cooperative unit while successfully performing channel estimation for the serving base station, the terminal can select a codebook most suitable to quantize a multi-antenna channel generated between the terminal and the serving cell base station using $N_{CQ}$, quantize information on the channel, and feed back the quantized channel information and information on the selected codebook to the base stations. In this case, the channel information is information on the multi-antenna channel between the terminal and the serving cell base station and may be represented as Vi. Here, the base stations can determine the final cooperative communication scheme for the terminal as NC (570).

If the base stations in the cooperative unit determine that the number of allowable feedback bits is $N_{CQ}$ and the allowable cooperative communication scheme is NC on the basis of the system environment and transmit the determination result to terminals. A terminal can select a codebook most suitable to quantize a multi-antenna channel generated between the terminal and the serving cell base station using $N_{CQ}$, quantize information on the channel, and feed back the quantized channel information and information on the selected codebook to the base stations. In this case, the channel information is information on the multi-antenna channel between the terminal and the serving cell base station and may be represented as Vi. Here, the base station can determine the final cooperative communication scheme for the terminal as NC (580).

A description will be given of exemplary feedback signals from a terminal when the adaptive channel information feedback scheme is used with reference to FIG. 6. As described above, a feedback signal from a terminal corresponds to information which is obtained by quantizing corresponding multi-antenna channel information based on a selected codebook (codebook most suitable for a cooperative unit, an allowable cooperative communication scheme and channel environment), which is most suitable when all allowable feedback bits, $N_{CQ}$, assigned to the terminal by a base station, are used, and fed back to the base station with information on the selected codebook. Furthermore, the number of allowable feedback bits, $N_{CQ}$, can be assigned various values by the base station on the basis of an average SNR measured and fed back by the terminal and system environment.

For the aforementioned adaptive channel information feedback, the base station and the terminal need to share a plurality of predetermined codebooks. The plurality of codebooks flexibly uses bits necessary to represent a PMI, SNR and rank within the number of allowable feedback bits, $N_{CQ}$. The plurality of codebooks may be provided for a plurality of cases of the number of allowable feedback bits.

To reduce the average number of bits necessary for channel information feedback as compared to the conventional single codebook based feedback scheme, the terminal can use a low resolution codebook to quantize information on virtual multi-antenna channels generated among multiple cells for a higher cooperative communication scheme and use a high resolution codebook to quantize information on a multi-antenna channel generated between the terminal and a serving cell for a lower cooperative communication scheme such as NC, while using the number of allowable feedback bits, $N_{CQ}$, designated by the base station.

It is assumed that the number of antennas of a transmitter (base station) is $N_T$, the number of antennas of a receiver (terminal) is $N_R$, and $N_T \geq N_R$. In this case, if three cells (first, second and third cells) belong to a cooperative unit, virtual multi-antenna channels ($H_{agg(1,2,3)} \in \mathbb{C}^{N_R \times 3N_T}$) generated between a terminal served by the first cell and base stations of the three cells (first, second and third cells) can be represented by the following Equation 1.

$$H_{agg(1,2,3)} = U_{agg(1,2,3)} \Sigma_{agg(1,2,3)} V_{agg(1,2,3)}^H \quad \text{[Equation 1]}$$
$$= [H_1 \ H_2 \ H_3]$$
$$= [U_1 \Sigma_1 V_1^H \ U_2 \Sigma_2 V_2^H \ U_3 \Sigma_3 V_3^H]$$

In Equation 1, $U_{agg(1,2,3)} \in \mathbb{C}^{N_R \times N_R}$, $\Sigma_{agg(1,2,3)} \in \mathbb{R}^{N_R \times 3N_T}$ and $V_{agg(1,2,3)} \in \mathbb{C}^{3N_T \times 3N_T}$ respectively correspond to the left singular matrix, eigenvalue matrix and right singular matrix $H_{agg(1,2,3)}$. $H_i \in \mathbb{C}^{N_R \times N_T}$, (i=1, 2, 3) represents a multi-antenna channel generated between the terminal and a base station of an i-th cell. $U_i \in \mathbb{C}^{N_R \times N_R}$, $\Sigma_i \in \mathbb{R}^{N_R \times N_T}$ and $V_i \in \mathbb{C}^{N_T \times N_T}$ respectively correspond to the left singular matrix, eigenvalue matrix and right singular matrix of $H_i$. Here, when only components $\Sigma_{agg(1,2,3)}^{eff} \in \mathbb{R}^{N_R \times N_R}$, $V_{agg(1,2,3)}^{eff} \in \mathbb{C}^{3N_T \times N_R}$ $\Sigma_i^{eff} \in \mathbb{R}^{N_R \times N_R}$ and $V_i^{eff} \in \mathbb{C}^{N_T \times N_R}$ relating to eigenvalues other than 0 are considered, $H_{agg(1,2,3)}$ can be expressed by the following Equation 2.

$$H_{agg(1,2,3)} = U_{agg(1,2,3)} \Sigma_{agg(1,2,3)}^{eff} (V_{agg(1,2,3)}^{eff})^H \quad \text{[Equation 2]}$$
$$= [U_1 \Sigma_1^{eff}(V_1^{eff}) \ U_2 \Sigma_2^{eff}(V_2^{eff}) \ U_3 \Sigma_3^{eff}(V_3^{eff})^H]$$

When the number of allowable feedback bits and the allowable cooperative communication scheme, determined by the base station, are $N_{CQ}$ and 3JP or 3C-BF, respectively, the terminal can select a codebook that can be used to quantize PMI $V_{agg(1,2,3)}^{eff}$, SNR $\Sigma_{agg(1,2,3)}^{eff}$ of each stream, and the number of pieces of data which can be independently transmitted (i.e. rank) of $H_{agg(1,2,3)}$ generated between the terminal and the three cells, quantize the information, and feed back the quantization result, that is, $Q(V_{agg(1,2,3)}^{eff}, \Sigma_{agg(1,2,3)}^{eff}, \Sigma_{agg(1,2)}^{eff}, \Sigma_{agg(1,3)}^{eff}, \Sigma_1^{eff}, \text{rank}(H_{agg(1,2,3)})|N_{CQ})$ and a codebook indicator indicating the selected codebook to the base station. That is, the terminal can configure the codebook indicator and quantized channel information to generate feedback information and transmit the feedback information to the base station, as shown in FIG. 6(a). Here, since the feedback channel information includes $\Sigma_{agg(1,2)}^{eff}$, $\Sigma_{agg(1,3)}^{eff}$ and $\Sigma_1^{eff}$, the base station can acquire an SNR corresponding to channel information used for a lower cooperative communication scheme, which is obtained using channel information for a higher cooperative communication scheme, fed back from the terminal, as described with reference to FIG. 5.

When the channel information for the higher cooperative communication scheme is fed back from the terminal and the base station determines one of the higher cooperative communication scheme and the lower cooperative communication scheme as a final cooperative communication scheme, $\Sigma_{agg(1,2)}^{eff}$ and $\Sigma_{agg(1,3)}^{eff}$ may not be included in the feedback information. That is, the quantized channel information may be configured as $Q(V_{agg(1,2,3)}^{eff}, \Sigma_{agg(1,2,3)}^{eff}, \Sigma_1^{eff}, \text{rank}(H_{agg(1,2,3)})|N_{CQ})$ and fed back to the base station (FIG. 6(b)). Accordingly, feedback bits which were used for $\Sigma_{agg(1,2)}^{eff}$ and $\Sigma_{agg(1,3)}^{eff}$ can be used for other information and quantization error can be reduced.

To allow the base station to obtain PMI information necessary for the lower cooperative communication scheme using PMI information necessary for the higher cooperative communication scheme, the relationship between $V_{agg(1,2,3)}^{eff}$ and $V_i^{eff}$ can be represented by the following Equation 3.

$$V_{agg(1,2,3)}^{eff} = \begin{bmatrix} V_{agg(1,2,3),1}^{eff} \\ V_{agg(1,2,3),2}^{eff} \\ V_{agg(1,2,3),3}^{eff} \end{bmatrix} \quad [\text{Equation 3}]$$

$$= \begin{bmatrix} V_1^{eff} \Sigma_1^{eff} U_1^H \\ V_2^{eff} \Sigma_2^{eff} U_2^H \\ V_3^{eff} \Sigma_3^{eff} U_3^H \end{bmatrix} U_{agg(1,2,3)} \left(\Sigma_{agg(1,2,3)}^{eff}\right)^{-1}$$

$V_i^{eff}$ can be represented as follows using Equation 3.

$$V_i^{eff} = V_{agg(1,2,3),i}^{eff} \Sigma_{agg(1,2,3)}^{eff} U_{agg(1,2,3)}^H U_i \left(\Sigma_i^{eff}\right)^{-1} \stackrel{e}{=} \hat{V}_{agg(1,2,3),i}^{eff} \quad [\text{Equation 4}]$$

In Equation 4, $\stackrel{e}{=}$ denotes equivalence relation in Grassmannian space. Accordingly, PMI information $\hat{V}_i^{eff}$, which is necessary for the terminal to feed back the channel information for the higher cooperative communication scheme and for the base station to perform the lower cooperative communication scheme, NC, based on the system environment, may be obtained by performing orthogonalization, for example, through the Gram-Schmidt process on the PMI information for the higher cooperation communication scheme, such as feedback $V_{agg(1,2,3)}^{eff}$.

As described above, according to the adaptive channel information feedback scheme of the present invention, channel information for a lower cooperative communication scheme can be acquired from channel information for a higher cooperative communication scheme, and thus it is not necessary to additionally provide the channel information for the lower cooperative communication scheme. Furthermore, since corresponding channels for the higher cooperative communication scheme are simultaneously quantized and information on the channels is simultaneously fed back, it is not necessary for each terminal to additionally feed back information on a phase difference between PMIs of cells with information on multi-antenna channels between each terminal and base stations of cells, and thus feedback overhead is not increased. In addition, since a most suitable codebook is selected from a plurality of predetermined codebooks, additional bits for feedback of a codebook selector may be required. However, the number of selectable codebooks can be limited to a small number according to system environment so as to improve efficiency.

When the number of allowable feedback bits and the allowable cooperative communication scheme, determined by the base station, are $N_{CQ}$ and 2JP or 2C-BF, respectively, a virtual multi-antenna channel relating to the cooperative communication scheme can be expressed by the following Equation 5.

$$H_{agg(1,2)} = U_{agg(1,2)} \Sigma_{agg(1)}^{eff} \left(V_{agg(1,2)}^{eff}\right)^H \quad [\text{Equation 5}]$$

$$= \begin{bmatrix} U_1 \Sigma_1^{eff} \left(V_1^{eff}\right)^H & U_2 \Sigma_2^{eff} \left(V_2^{eff}\right)^H \end{bmatrix}$$

Here, the terminal can select a codebook that can be used to quantize all channels generated between the terminal and base stations of two cooperative cells using $N_{CQ}$, quantize information on the channels, and then feed back the quantized channel information $Q(V_{agg(1,2)}^{eff}, \Sigma_{agg(1,2)}^{eff}, \Sigma_1^{eff}, \text{rank}(H_{agg(1,2)})|N_{CQ})$ with a codebook indicator indicating the selected codebook to the base station (FIG. 6(c)).

When the number of allowable feedback bits and the allowable cooperative communication scheme, determined by the base station, are $N_{CQ}$ and NC, respectively, the terminal can select a codebook that can be used to quantize a multi-antennal channel generated between the terminal and a serving cell using $N_{CQ}$, quantize information on the channel, and then feed back the quantized channel information $Q(V_1^{eff}, \Sigma_1^{eff}, \text{rank}(H_1)|N_{CQ})$ with a codebook indicator indicating the selected codebook to the base station (FIG. 6(d)).

A description will be given of the performance of the adaptive channel information feedback scheme according to an embodiment of the present invention with reference to FIGS. 7 and 8.

Figure 7:
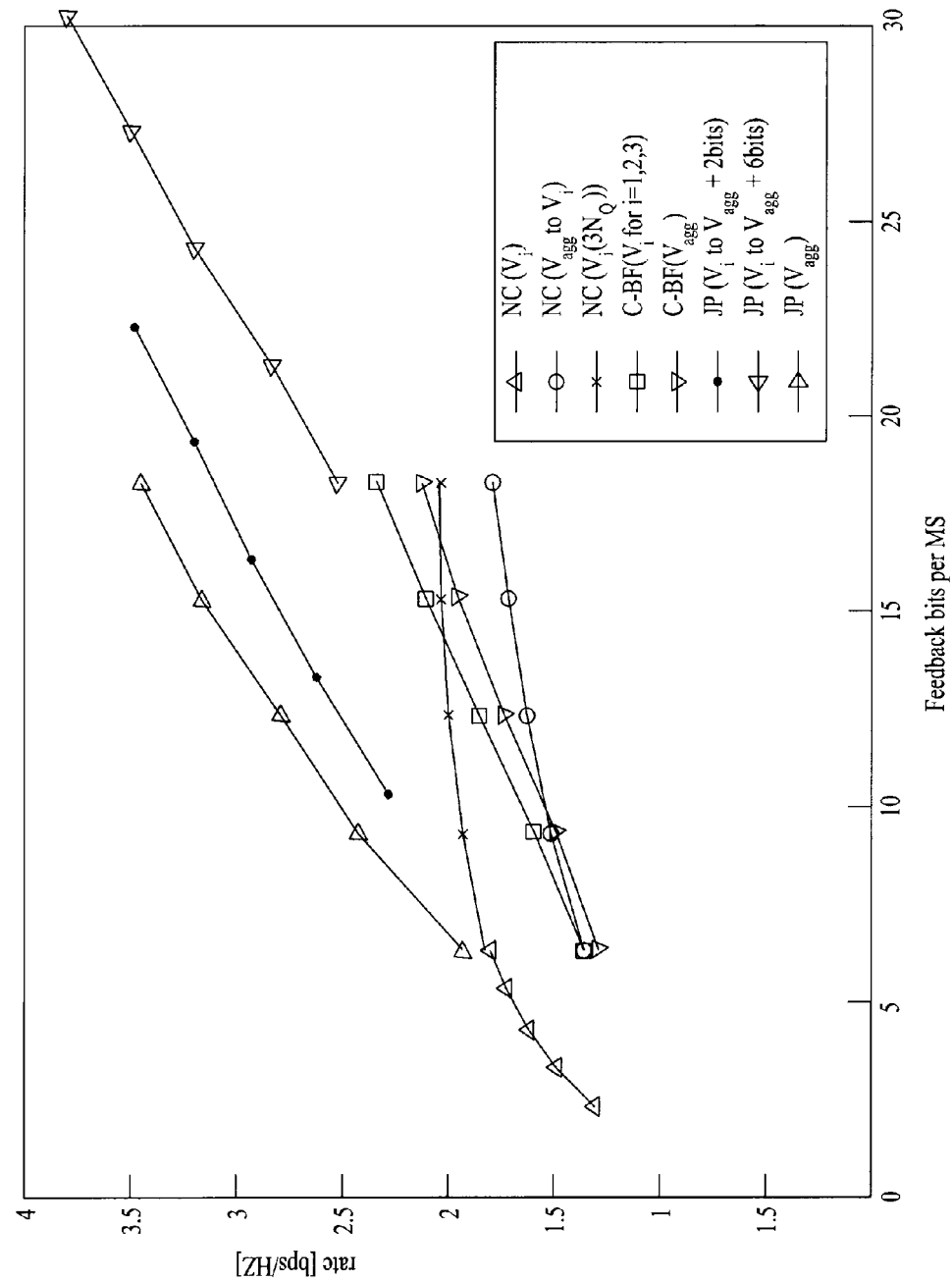
FIGS. 7 and 8 show simulation results with respect to adaptive channel information feedback according to an embodiment of the present invention.

FIG. 7 shows a data rate of each cooperative communication scheme depending on feedback bits per MS, used to feed back PMI information according to the channel information feedback scheme when three neighboring cells belong to a cooperative unit and terminals are located at a cell boundary and greatly interfere with each other. For simulations with respect to the result of FIG. 7, it was assumed that SNR and rank information are successfully fed back, 3JP, 3C-BF and 3NC were considered as cooperative communication schemes, and the scheme by which a terminal independently quantizes PMI information of each cell and feeds back the quantized information and the scheme of the present invention by which a terminal simultaneously quantizes PMIs of all channels with respect to cooperative cells were considered as feedback schemes. In addition, the simulations were carried out on the assumption that a path attenuation coefficient is 4, a SNR at the cell boundary is 10 dB, the terminal has one antenna and a base station has four antennas.

According to the simulation result, the data rate in case of simultaneous quantization of PMIs $V_{agg(1,2,3)}^{eff}$ of all channels according to the present invention is higher than the data rate in case of independent quantization of PMI $V_i^{eff}$ of each cell and additional quantization of a phase difference between PMIs of cells when JP is considered as a cooperative communication scheme. Furthermore, when interferences from cells do not affect the cells since the number of transmit antennas is greater than the number of cells when the number of allowable feedback bits is designated as small, it may be more efficient for each terminal to quantize channel information of the serving cell and perform NC than to perform C-BF. Conversely, C-BF exhibits higher performance than NC as the number of allowable feedback bits increases. In addition, channel information necessary for a lower cooperative communication scheme can be obtained from channel information necessary for a higher cooperative communication scheme, and performance is improved as the number of feedback bits increases.

Figure 8:
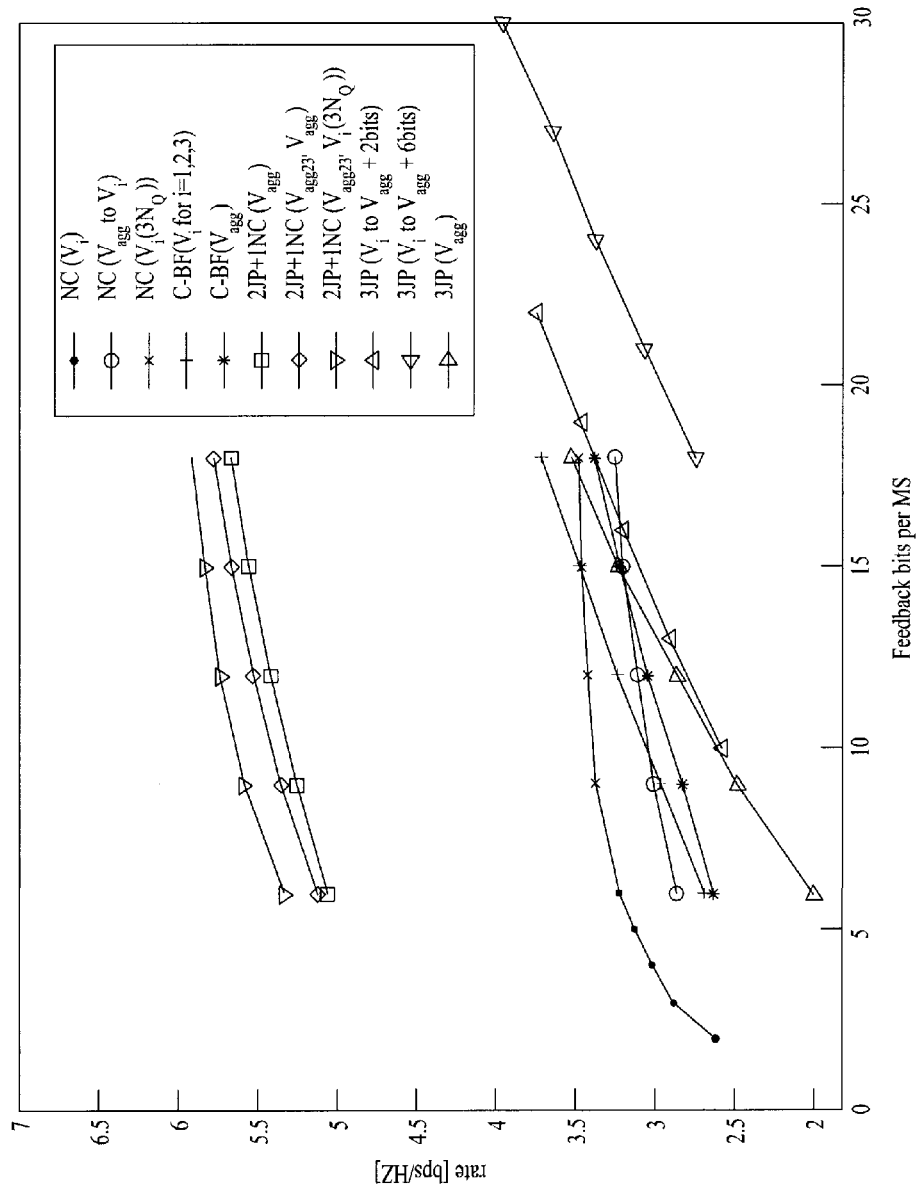

FIG. 8 shows a data rate of each cooperative communication scheme depending on feedback bits per MS, used to feed back PMI information according to the channel information feedback scheme when three neighboring cells belong to a cooperative unit, terminals belonging to the second and third cells are located at a cell boundary and greatly interfere with each other, and a terminal belonging to the first cell is close to a base station and less interfere with other terminals. For simulations which produce the result of FIG. 8, it was assumed that SNR and rank information are successfully fed back, 3JP, 2JP+1NC, 3C-BF and 3NC were considered as cooperative communication schemes, and the scheme by which a terminal independently quantizes PMI information of each cell and feeds back the quantized information and the scheme of the present invention by which a terminal simultaneously quantizes PMIs of all channels with respect to cooperative cells were considered as feedback schemes. In addition, the simulations were carried out on the assumption that a path attenuation coefficient is 4, a SNR at the cell boundary is 10 dB, the terminal has one antenna and the base station has four antennas.

According to the simulation result, the highest performance can be obtained against feedback overhead when the second and third cells, which greatly interfere with each other, perform 2JP and quantization is concentrated on PMIs $V_{agg(2,3)}^{eff}$. Furthermore, while C-BF can obtain performance higher than NC when the number of allowable feedback bits is large, higher performance can be achieved when NC is adopted and each terminal focuses quantization on channel information of the serving cell if the number of allowed feedback bits is not large.

As can be seen from the simulation results of FIGS. 7 and 8, the scheme of previously generating a plurality of codebooks in a range in which the codebooks are normally used, that is, on the basis of the number of cooperative cells and the number of allowable feedback bits, adaptively selecting a codebook most suitable for a cooperative unit and a cooperative communication scheme, determined by the base station, efficiently quantizing channel information necessary for multi-cell cooperative communication using the selected codebook, and feeding back the quantized channel information to the base station can achieve high performance, as compared to the conventional scheme of independently quantizing channel information on each cell using a single codebook, additionally quantizing information on a phase difference between cells if required, and feeding back the quantized information, on the basis of the same system overhead.

When the present invention is applied to a multi-cell communication system which performs multi-cell cooperative communication, a terminal can adaptively select a codebook most suitable for the cooperative unit, the allowable cooperative communication scheme and the current channel environment and quantize corresponding multi-antenna channel information to improve efficiency, and improved system performance can be obtained, as compared to the feedback scheme that quantizes information on each channel based on a single codebook, when the same feedback overhead is used. Furthermore, the terminal can obtain channel information necessary for a lower cooperative communication scheme using feedback channel information for a higher cooperative communication scheme by adopting a low-resolution codebook for quantization of channel information necessary for the higher cooperative communication scheme and adopting a high resolution codebook for quantization of channel information necessary for the lower cooperative communication scheme while using the number of allowable feedback bits, designated by the base station, and thus the average number of bits necessary for feedback can be reduced. Furthermore, the BS can select a cooperative communication scheme from lower cooperative communication schemes including the allowable cooperative communication scheme on the basis of system and channel environments, and thus the base station can use channel information more efficiently.

Moreover, the plurality of codebooks may be defined as separate codebooks or as a multi-level codebook. For example, the multi-level codebook is configured in such a manner that a subset of a codebook configures a low-resolution codebook and a set of a plurality of subsets configures a high-resolution codebook.

In the above description, while JP, C-BF and NC are exemplified as cooperative communication schemes, the present invention is not limited thereto. That is, various cooperative communication schemes can be used in addition to JP, C-BF and NC. Furthermore, in case of satisfactory system environment, the aforementioned adaptive channel information feedback scheme according to the present invention can be implemented by defining a higher cooperative communication scheme as an available cooperative communication scheme.

Adaptive Cooperative Transmission Mode Selection Scheme

A description will be given of an adaptive cooperative transmission selection scheme for multi-cell cooperative communication in a multi-cell communication system.

FIG. 9 illustrates determination of a cooperative unit by a BS (or cell) for cooperative transmission. When there are three neighboring BSs, four cases as shown in FIGS. 9(a) to 9(d) may be considered according to whether a terminal is a non-cooperative terminal that does not request cooperative transmission or a cooperative terminal that requests cooperative transmission.

In the example of FIG. 9(a), when terminals belonging to BSs are all non-cooperative terminals, data transmission can be performed using the NC transmission mode (i.e. cooperative transmission is not performed). In the example of FIG. 9(b), if two of three terminals are non-cooperative terminals and one is a cooperative terminal, data can be transmitted using the NC transmission mode. In the example of FIG. 9(c), if two of three terminals are cooperative terminals and one is a non-cooperative terminal, the BSs to which the two cooperative terminals belong form a basic cooperative unit and the non-cooperative terminal can use NC. In the example of FIG. 9(d), when all three terminals are cooperative terminals, all three BSs can be included in the cooperative unit. In the examples of FIGS. 9(c) and 9(d), JP and C-BF can be used as a cooperative communication scheme.

Figure 10:
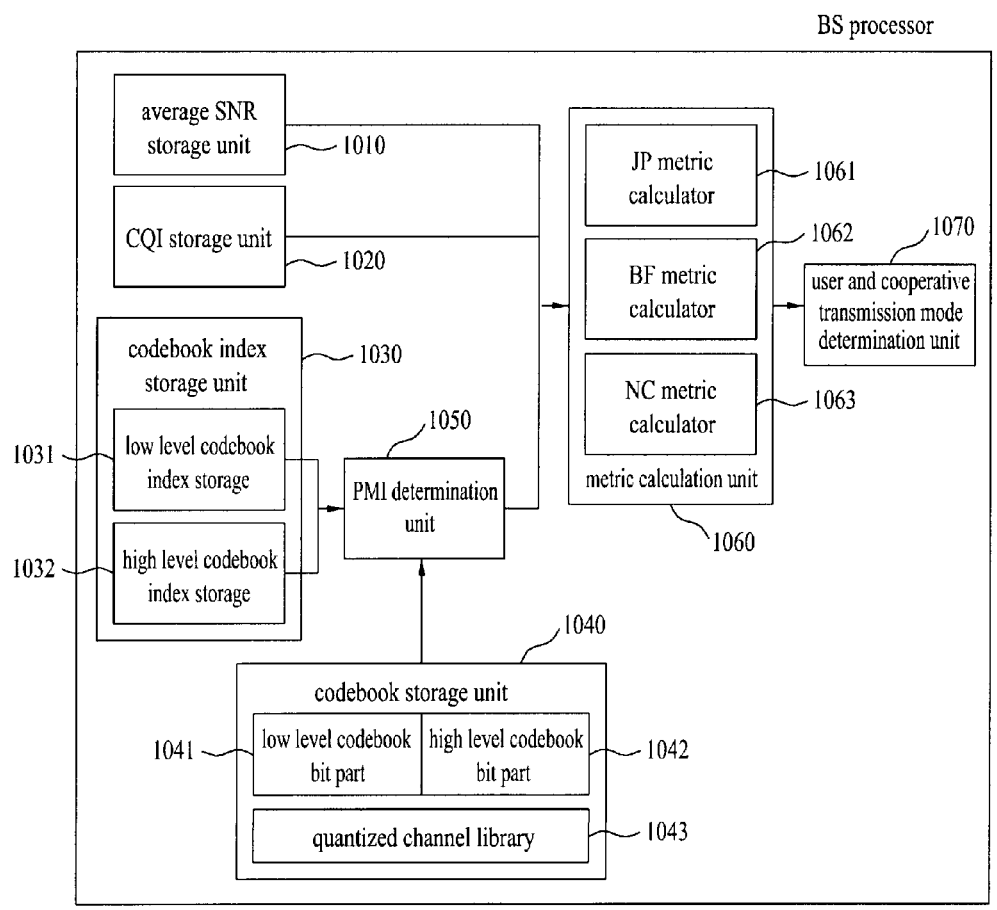
FIG. 10 is a block diagram of a processor of a base station device for adaptive multi-cell cooperative transmission mode selection and radio resource management according to an embodiment of the present invention.

FIG. 10 is a functional block diagram of a processor of a BS device for adaptive multi-cell cooperative transmission mode selection and radio resource management according to an embodiment of the present invention.

The BS processor may include an average transmission rate information storage unit 1010, a CQI information storage unit 1020, a codebook index storage unit 1030, a codebook storage unit 1040, a PMI determination unit 1050, a metric calculation unit 1060, and a user and cooperative transmission mode determination unit 1070.

The average transmission rate information storage unit 1010 can store average transmission rates of terminals belonging to BSs in a cooperative unit. The CQI information storage unit 1020 can store CQIs fed back from the terminals belonging to the BSs in the cooperative unit.

The codebook index storage unit 1030 may include a low level codebook index storage 1031 and a high level codebook index storage 1032. The low level codebook index storage 1031 can store low level codebook indexes of channels fed back from the terminals belonging to the BSs in the cooperative unit, whereas the high level codebook index storage 1032 can store high level codebook indexes of the channels fed back from the terminals belonging to the BSs in the cooperative unit. The low level codebook indexes and high level codebook indexes are associated with determination of initial cooperative terminals and final cooperative terminals by the BS according to the present invention. A process relating to determination of initial cooperative terminals and final cooperative terminals is briefly described. When the BS transmits a pilot to terminals and requests the terminals to provide CQIs and PMIs in order to determine the initial cooperative terminals, the terminals can calculate the CQIs and PMI using a low level codebook bit part indicated by the low level codebook indexes and feed the calculated CQIs and PMIs back to the BS. Then, the BS can select the initial cooperative terminals using the feedback information from the terminals. The BS requests the selected initial cooperative terminals to feed back channel information corresponding to high level codebooks. The initial cooperative terminals can calculate PMIs and CQIs using a high level codebook bit part indicated by the high level codebook indexes and feed the calculated PMIs and CQIs back to the BS.

The codebook storage unit 1040 can store codebooks which have been generated in advance and shared by BSs and terminals. The codebook storage unit 1040 may store a low level codebook bit part 1041, a high level codebook bit part 1042 and a quantized channel library 1043. The low level codebook bit part 1041 is a part in which codebooks corresponding to the low level codebook indexes are stored and the high level codebook bit part 1042 is a part in which codebooks corresponding to the high level codebook indexes are stored. The quantized channel library 1043 can store quantized channel information.

The PMI determination unit 1050 can determine PMIs of channels between terminals and the BS. PMIs with respect to cooperative communication schemes (JP, C-BF and NC) are respectively calculated. The PMIs may be used for quantized channel information fed back from terminals. The PMIs calculated for the respective cooperative communication schemes may be transmitted to the metric calculation unit 1060. The metric calculation unit 1060 can calculate metric values for the respective cooperative communication schemes (1061, 1062 and 1063) and transmit the metric values to the user and cooperative transmission mode determination unit 1070. The user and cooperative transmission mode determination unit 1070 can perform user scheduling and select an adaptive cooperative transmission mode by comparing the metric values for the respective cooperative communication schemes.

The BS device may include a reception module, a transmission module, a memory and an antenna in addition to the processor. The reception module may receive signals, data, and information from terminals. The transmission module may transmit signals, data and information to the terminals. The BS device may include a plurality of antennas. In addition to the above-mentioned functions, the processor may be configured to control the overall operation of the BS device including the reception module, transmission module, memory and antenna. Furthermore, the processor may process information received by the BS device and information to be transmitted. The memory may store the processed information for a predetermined time and may be replaced with a component such as a buffer (not shown).

The average transmission rate information storage unit 1010, the CQI information storage unit 1020, the codebook index storage unit 1030 and the codebook storage unit 1040 may be included as functional blocks of the memory (not shown) of the BS device.

Figure 11:
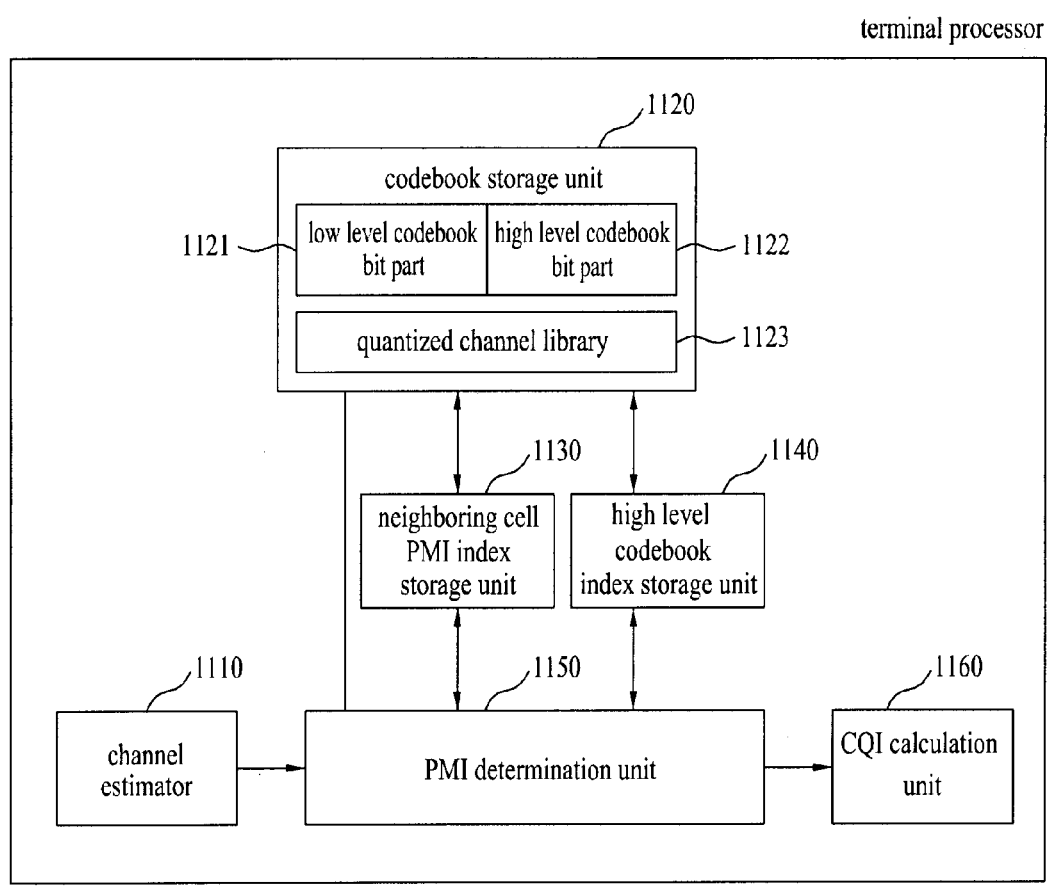
FIG. 11 is a block diagram of a processor of a terminal device for adaptive multi-cell cooperative transmission mode selection and radio resource management according to an embodiment of the present invention.

FIG. 11 is a functional block diagram of a process or a terminal device for adaptive multi-cell cooperative transmission mode selection and radio resource management according to an embodiment of the present invention.

The process of the terminal device may include a channel estimator 1110, a codebook storage unit 1120, a neighboring cell PMI index storage unit 1130, a high level codebook index storage unit 1140, a PMI determination unit 1150, and a CQI calculation unit 1160.

The channel estimator 1110 can estimate a channel between the corresponding terminal and each BS. Channel estimation can be performed using a pilot signal transmitted from the BS, as widely known in the art. Detailed description of channel estimation is omitted for clarity.

The codebook storage unit 1120 can store codebooks which have been generated in advance and shared by BSs and the terminals, a low level codebook bit part 1121, a high level codebook bit part 1122, and a quantized channel library 1123.

The neighboring cell PMI index storage unit 1130 can store PMIs with respect to channels between the terminal and neighboring cells in the cooperative unit and transmit the PMIs to the PMI determination unit 1150 for cooperative transmission. The PMIs can be transmitted by a BS using a downlink control signal. The PMI determination unit 1150 can determine PMIs used for cooperative transmission using channel information and transmit the PMIs to the CQI calculation unit 1160. The CQI calculation unit 1160 can calculate CQI using channel information of the corresponding terminal and the PMIs.

The BS can request the terminal to feed back channel information using information corresponding to high level codebooks, and the high level codebook index storage unit 1140 can store high level codebook indexes provided by the BS. The PMI determination unit 1150 determines the PMIs used for cooperative transmission using the high level codebook bit part 1122 indicated by the high level codebook indexes and the CQI calculation unit 1160 calculates CQIs and feeds the CQIs back to the BS.

The terminal device may include a reception module, a transmission module, a memory and an antenna in addition to the processor. The reception module may receive signals, data, and information from BSs. The transmission module may transmit signals, data and information to the BSs. The terminal device may include a plurality of antennas. In addition to the above-mentioned functions, the processor may be configured to control the overall operation of the terminal device including the reception module, transmission module, memory and antenna. Furthermore, the processor may process information received by the terminal device and information to be transmitted. The memory may store the processed information for a predetermined time and may be replaced with a component such as a buffer (not shown).

The codebook storage unit 1120, the neighboring cell PMI index storage unit 1130 and the high level codebook index storage unit 1140 may be included as functional blocks of the memory (not shown) of the terminal device.

Figure 12:
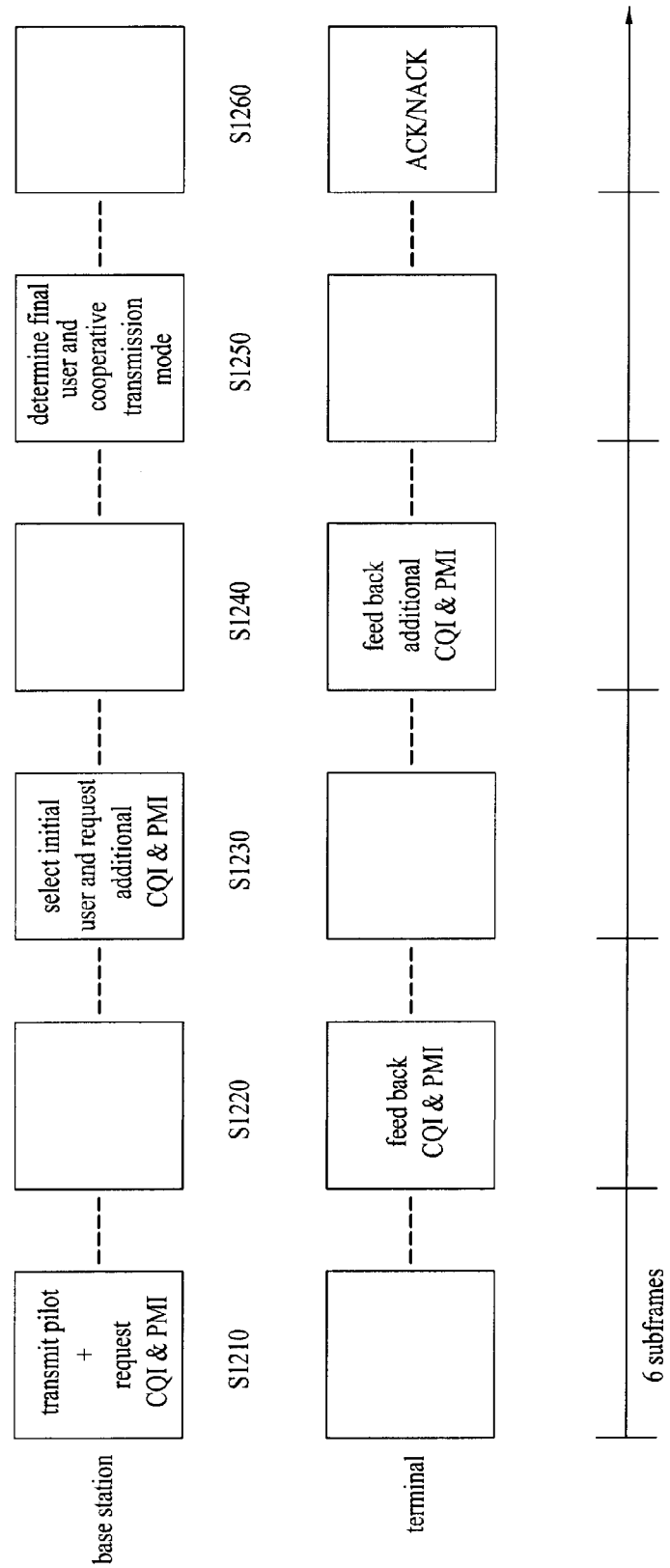
FIG. 12 illustrates operations of a terminal and a base station for adaptive multi-cell cooperative transmission mode selection and radio resource management according to an embodiment of the present invention.

FIG. 12 illustrates time-based (e.g. subframe-based) operations of a BS and a terminal for adaptive multi-cell cooperative transmission mode selection and radio resource management according to an embodiment of the present invention. Referring to FIG. 12, an operation flow of the BS and the terminal may include step S1210 in which the BS transits a pilot signal to the terminal and requests the terminal to feed back a CQI and PMI, step S1220 in which the terminal feeds back the CQI and PMI, step S1230 in which the BS selects an initial cooperative terminal using feedback information from the terminal and request the selected initial cooperative terminal to feed back an additional CQI and PMI, step S1240 in which the terminal feeds back the additional CQI and PMI, step S1250 in which the BS determines a final cooperative terminal and a cooperative transmission mode using the feedback information from the terminal, and step S1260 in which the BS transmits data to the final cooperative terminal using the determined cooperative transmission mode and the terminal transmits an acknowledgement (ACK/NACK) for the data received from the BS.

In the aforementioned operation, the terminal may transmit feedbacks of different levels. That is, the terminal can transmit a first feedback (CQI and PMI feedback of S1220) to the BS such that the BS can select the initial cooperative terminal and transmit a second feedback (additional CQI and PMI feedback of S1240) to the BS such that the BS can select the final cooperative terminal. For feedback of different levels, codebooks having different resolutions, that is, a multi-level codebook, can be used. Specifically, the multi-level codebook may be a codebook which is designed such that resolution of channel information becomes close to actual channel characteristics as the number of bits of the codebook increases. In other words, more accurate channel information can be fed back when channel information is quantized using a larger number of bits (a codebook having higher resolution), whereas less accurate channel information can be fed back when channel information is quantized using a smaller number of bits (a codebook having lower resolution).

For example, the multi-level codebook can be defined as a combination of low resolution codebooks. That is, if W1 and W2 respectively correspond to low resolution codebooks, a combination of W1 and W2, W1·W2, can be defined as a high resolution codebook. Here, if only one of W1 and W2 is set to a codebook, the codebook can be used as a low level (low resolution) codebook. If W1·W2 is set to a codebook, this codebook can be used as a high level (high resolution) codebook.

The aforementioned first feedback may include a periodic feedback of channel status information (CSI) about a plurality of bands using a low resolution codebook, transmitted by the cooperative terminal. When the terminal receives, from the BS, a CQI feedback request signal including channel information on a neighboring BS (S1230) during transmission of the first feedback (S1220), the terminal can calculate a PMI and CQI on the basis of the channel information on the neighboring BS using a high resolution codebook for a band designated by the BS and transmit the PMI and CQI with high resolution codebook index information to the BS as the second feedback (S1240).

Each step described in FIG. 12 will now be described in more detail.

In S1210, the BS can transmit the pilot signal to the terminal, provide information on subbands and request the terminal to feed back channel information (CQI, PMI, etc.) on the subbands. Here, the information on the subbands may be provided through a downlink control signal and may include information which directs a cooperative terminal to select $M_{CoMP}$ subbands and directs a non-cooperative terminal to select $M_{Non-CoMP}$ subbands.

In S1220, each cooperative terminal can estimate channels using the pilot signal transmitted from the BS and select subbands most suitable therefor using estimated channel statuses. That is, terminals that prefer cooperative transmission schemes such as JP and BF can estimate channels of subbands (e.g. using the following equation) and select $M_{CoMP}$ subbands corresponding to high estimated channel quality values. A cooperative terminal belonging to an i-th BS can calculate a CQI corresponding to an n-th subband according to Equation 6.

[Equation 6]

$$r_{i,n}^{CoMP\_UE} = \log_2 \det \left( \frac{I_{N_R} + p(H_{i,n}W_{i,n})(H_{i,n}W_{i,n})^H}{\left(N_0 I_{N_R} + \sum_{j \neq i} p(H_{i,n}W_{j,n})(H_{i,n}W_{j,n})^H\right)^{-1}} \right)$$

$$= \log_2 \det \left( \frac{I_{N_R} + p(H_{i,n}W_{i,n})(H_{i,n}W_{i,n})^H}{\left(N_0 I_{N_R} + \sum_{j \neq i} p(\Sigma_{i,n}(\hat{V}_{i,n}^{(1)} + E_{i,n})W_{j,n})\right)^{-1}} \right)$$

$$\left( \Sigma_{i,n}(\hat{V}_{i,n}^{(1)} + E_{i,n})W_{j,n} \right)^H$$

$$= \log_2 \det \left( \frac{I_{N_R} + pH_{i,n}W_{i,n}^H H_{i,n}^H}{\left(N_0 I_{N_R} + \sum_{j \neq i} pE_{i,n}W_{j,n}W_{j,n}^H E_{i,n}^H \Sigma_{i,n}^2\right)^{-1}} \right)$$

$$\simeq \log_2 \det \left( \frac{I_{N_R} + \frac{E_s}{N_C N_T} H_{i,n} H_{i,n}^H}{\left(N_0 I_{N_R} + \frac{E_s(N_C-1)}{N_C N_T} E_{i,n} E_{i,n}^H \Sigma_{i,n}^2\right)^{-1}} \right)$$

In Equation 6, $N_R$ denotes the number of receive antennas of each terminal, $N_T$ denotes the number of transmit antennas of each BS, $E_s$ represents total transmission power of each BS, $N_C$ is the number of cooperative BSs, $N_0$ represents noise variance, and $H_{i,n}$ is a channel value of an n-th subband of an i-th user. In addition, $\Sigma_{i,n}$ is a matrix by which the channel value can be obtained from $H_{i,n} = U_{i,n} \Sigma_{i,n} [V_{i,n}^{(1)} V_{i,n}^{(0)}]^H$ through singular value decomposition (SVD).

According to Equation 6, each terminal can calculate the average transmission rate when data is received through JP from among multi-cell cooperative transmission schemes, on the basis of an error between an estimated channel direction value and a quantized channel direction value. A quantized channel direction matrix $\hat{V}_{i,n}^{(1)}$ used in this calculation is a quantized channel value corresponding to a low level bit part of a codebook. Accordingly, it is possible to select a larger number of subbands, as compared to feedback based on a single codebook, and feed back the subbands when considering feedback overhead of the system. Specifically, when there is the upper limit T of feedback overhead of the system, if A-bit channel information on one subband can be fed back for p subbands using a single codebook (e.g. A×p=T), A'-bit channel information (A'<A) on one subband can be fed back for p' subbands (p'>p) (e.g. A'×p'=T) when a low level codebook having resolution lower than the single codebook is used. Accordingly, the terminal can select a larger number of subbands using the low level bit part of the codebook and feed back channel information on the subbands. The cooperative terminal can feed back subband index information on the finally selected $M_{CoMP}$ subbands, PMI information and calculated CQI information to the BS.

Non-cooperative terminals can calculate CQIs corresponding to subbands using Equation 7 and select $M_{Non\text{-}CoMP}$ most suitable subbands in order by comparing the CQIs. A non-cooperative terminal of the i-th BS can calculate a CQI corresponding to the n-th subband according to Equation 7.

$$r_{i,n}^{Non\text{-}CoMP\_UE} = \qquad \text{[Equation 7]}$$
$$\log_2 \det\left(I_{N_R} + \frac{E_s}{N_R}(H_{ii,n}W_{i,n})(H_{ii,n}W_{i,n})^H (N_0 I_{N_R})^1\right)$$

In Equation 7, $H_{ii,n}$ is channel information on an n-th sub channel between the i-th BS and a terminal of the BS, and $W_{i,n}$ is a PMI matrix determined as $W_{i,n} = V_{ii,n}^{(1)}$ from $H_{ii,n} = U_{ii,n}\Sigma_{ii,n}[V_{ii,n}^{(1)}V_{ii,n}^{(0)}]^H$. The non-cooperative terminals can feed back subband index information on the finally selected $M_{Non\text{-}CoMP}$ subbands, PMI information and calculated CQI information to the corresponding BS.

Even a cooperative terminal can feed back CQI information obtained using Equation 7 to the corresponding BS in consideration of a case in which a non-cooperative transmission scheme (i.e. NC mode) is determined as a transmission scheme.

In S1230, the BS can select initial cooperative terminals using feedback channel information corresponding to each subband. As described above with reference to FIG. 9, the BS can determine a cooperative unit for cooperative transmission according to whether a terminal that attempts to use each subband is a cooperative terminal or a non-cooperative terminal. Then, the BS can perform primary scheduling for the initial cooperative terminals. To schedule the initial cooperative terminals for which cooperative transmission has been determined, the BS can select terminals that can maximize proportional fairness using the following Equation 8. Equation 8 is used to obtain a proportional fairness metric for $n_{sub}$-th subband at time t.

$$S^*(t, n_{sub}) = \arg\max_S \sum_c \sum_{k \in S} \log R_{k,c}(t, n_{sub} + 1) \quad \text{[Equation 8]}$$

$$R_{k,n}(t, n_{sub} + 1) =$$
$$\left(1 - \frac{1}{t + \frac{n_{sub} - 1}{N_{sub}}}\right) R_{k,n}(t, n_{sub}) + \frac{1}{t + \frac{n_{sub} - 1}{N_{sub}}}$$
$$I_{k,n}(t, n_{sub}) r_{k,n}^{CoMP}(t, n_{sub}) \text{ where } 1 \le n_{sub} \le N_{sub}$$
$$R_{k,n}(t+1, 1) = R_{k,n}(t, N_{sub} + 1)$$
$$I_{k,n}(t, n_{sub}) = \begin{cases} 1 & \text{if } kth \text{ user in } nth \text{ cell is scheduled in } nth \text{ subband} \\ 0 & \text{otherwise} \end{cases}$$

In Equation 8, S is a set of available combinations of terminals that belong to a BS in a cooperative unit, which selects the $n_{sub}$-th subband, and $R_{k,n}(t, n_{sub})$ is the average transmission rate of terminals belonging to an n-th cooperative BS, which are included in a k-th terminal combination in the $n_{sub}$-th subband at time t. In addition, $r_{k,n}^{CoMP}(t, n_{sub})$ denotes a CQI of a terminal belonging to the n-th cooperative BS, which is included in the k-th terminal combination in the $n_{sub}$-th subband at t, using a PMI calculated by exchanging channel information between through a backhaul, and can be calculated by the following Equation 9.

[Equation 9]
$$r_{k,n}^{CoMP}(t, n_{sub}) =$$
$$\log_2 \det\left(I_{N_R} + p(H_n W_n)(H_n W_n)^H \left(N_0 I_{N_R} + \sum_{j \ne n} p(H_n W_j)(H_n W_j)^H\right)^{-1}\right)$$

In reference to Equation 9, block diagonalization can be used to support JP, and $$\sum_{j \ne n} p(H_n W_j)(H_n W_j)^H$$

can become a zero matrix because the block diagonalization does not cause inter-cell interference. Here, the PMI is calculated using quantized feedback channel information, and thus an error between the calculated value and the actual channel may be generated. The influence of this error can be reduced by determining a plurality of different sets as terminal sets in Equation 9.

For non-cooperative terminals, the BS can perform scheduling using a metric expressed by the following Equation 10. The metric for selecting terminals that maximize proportional fairness for the $n_{sub}$-th subband at t can be calculated using Equation 10.

$$s_n^*(t, n_{sub}) = \arg\max_k \frac{r_{k,n}^{Non\text{-}CoMP}(t, n_{sub})}{R_{k,n}(t, n_{sub})} \quad \text{[Equation 10]}$$

In Equation 10, $r_{k,n}^{Non\text{-}CoMP}(t, n_{sub})$ is a CQI of a k-th terminal belonging to the n-th BS in the $n_{sub}$-th subband at feedback time t.

The BS can select terminals that maximize proportional fairness for each subband through the above-mentioned procedure (select initial cooperative terminals) in step S1230 and transmit PMI information corresponding to other cooperative terminals belonging to neighboring cells to the selected cooperative terminals through a downlink control signal. Furthermore, the BS can request the selected cooperative terminals to calculate CQIs additionally using high level codebook bit information and feed back the calculated CQIs. The BS performs final data transmission without requesting high level codebook based channel information feedback to terminals that are determined as non-cooperative (NC) terminals.

In S1240, each terminal selected as a cooperative terminal can be assigned a subband by the BS through a downlink control signal and feed back accurate channel information on the assigned subband to the Bs. Here, the accurate channel information on the assigned subband can be acquired using channel information on other cooperative terminals belonging to neighboring cells and a high level codebook bit part. The high level codebook bit part is indicated by high level codebook indexes in the multi-level codebook. The high level codebook indexes may be determined as corresponding to low level codebook indexes used for channel information feedback of S1220. For example, if the multi-level codebook is set as W1·W2, one of W1 and W2 corresponds to a low level codebook and W1·W2 corresponds to a high level codebook. Accordingly, when a low level codebook index indicates W1, a high level codebook index corresponding to the low level codebook index can be defined to indicate W1·W2.

The terminal can acquire more accurate quantized channel information using channel information on other cooperative terminals belonging to neighboring cells and the high level code book bit part and calculate a CQI with respect to JP using the channel information according to the following Equation 11.

$$r_{i,n} = \log_2 \det \quad \text{[Equation 11]}$$

$$\left( I_{N_R} + p(H_{i,n}W_{i,n})(H_{i,n}W_{i,n})^H \left( N_0 I_{N_R} + \sum_{j \neq i} p(H_{i,n}W_{j,n})(H_i W_{j,n})^H \right)^{-1} \right)$$

$$p = E_s \bigg/ \max_j \left( \sum_{i=(N_T-1)j+1}^{N_T j} [WW^H]_{(i,i)} \right)$$

In Equation 11, W represents the PMI for the JP mode and is a matrix calculated through a predetermined computation process taking channel information of cooperative terminals into account. For details of the matrix W, reference can be made to "Limited feedback-based block diagonalization for the MIMO broadcast channel" reported by Niranjay Ravindran and Nihar Jindal in IEEE Journal on Selected Areas in communications in 2008. The terminal can feed back the CQI calculated using Equation 11 with the high level codebook index to the BS.

In S1250, the BS can calculate metric values with respect to cooperative transmission modes for the terminals (initial cooperative terminals) selected for each subband and determine final cooperative terminals that maximize proportional fairness and a final cooperative transmission mode by comparing the metric values. A proportional fairness metric value for the $n_{sub}$-th subband at t can be calculated according to Equation 12.

$$[S^{}(t, n_{sub}), T^{}(t, n_{sub})] = \quad \text{[Equation 12]}$$

$$\operatorname*{argmax}_{S,T} \sum_n \sum_{k \in S} \log R_{k,n}^T(t, n_{sub}+1)$$

$$R_{k,n}^T(t, n_{sub}+1) = \left(1 - \frac{1}{t + \frac{n_{sub}-1}{N_{sub}}}\right) R_{k,n}(t, n_{sub}) +$$

$$\frac{1}{t + \frac{n_{sub}-1}{N_{sub}}} I_{k,n}(t, n_{sub}) r_{k,n}^T(t, n_{sub}) \text{ where } 1 \leq$$

$$n_{sub} \leq N_{sub}, T \in \{JP, BF, NC\}$$

In Equation 12, the CQI fed back from the terminal can be used as $r_{k,n}^{JP}$. The BSs in the cooperative unit can exchange the CQI fed back from the terminal and the high level codebook index through the backhaul.

The transmission rate $r_{k,n}^{BF}$ for calculating the proportional fairness metric with respect to BF can be calculated according to the following Equation 13.

$$r_{k,n}^{BF} = \log_2 \det \left( I_{N_R} + \frac{E_s}{N_R} (\hat{H}_{nn} W_n^{BF})(\hat{H}_{nn} W_n^{BF})^H \right. \quad \text{[Equation 13]}$$

$$\left. \left( N_0 I_{N_R} + \sum_{j \neq n} \frac{E_s}{N_R} (\hat{H}_{nj} W_j^{BF})(\hat{H}_{nj} W_j^{BF})^H \right)^{-1} \right)$$

In Equation 13, $W_n^{BF}$ is a PMI for C-BF and represents a matrix obtained through a predetermined calculation process that maximizes signal-to-generating interference and noise ratio (SGINR) of cooperative terminals. For details of $W_n^{BF}$ reference can be made to "Interference-aware decentralized precoding for multicell MIMO TDD systems" reported by Byong Ok Lee, Hui Won Je, Oh-Soon Shin and Kwang bok Lee in Global Communications Conference, 2008.

Even if a cooperative transmission scheme is determined to be used, a more satisfactory result may be obtained when cooperative transmission is not performed. Accordingly, it is necessary to consider NC as a transmission scheme for cooperative terminals. A metric value for NC can be calculated by the following Equation 14.

$$r_{k,n}^{NC} = \log_2 \det \left( I_{N_R} + \frac{E_s}{N_R} (\hat{H}_{nn} W_n^{NC})(\hat{H}_{nn} W_n^{NC})^H \right. \quad \text{[Equation 14]}$$

$$\left. \left( N_0 I_{N_R} + \sum_{j \neq n} \frac{E_s}{N_R} (\hat{H}_{nj} W_j^{NC})(\hat{H}_{nj} W_j^{NC})^H \right)^{-1} \right)$$

In Equation 14, $W_n^{NC} = \hat{H}_{nm}^\dagger$ and $(\bullet)^\dagger$ is Hermitian operator.

In S1260, each cooperative terminal can receive data from the BS according to the cooperative transmission scheme determined through steps S1210 to S1250 and transmit an acknowledgement (ACK/NACK) signal representing whether the data has been successfully received to the BS.

Figure 13:
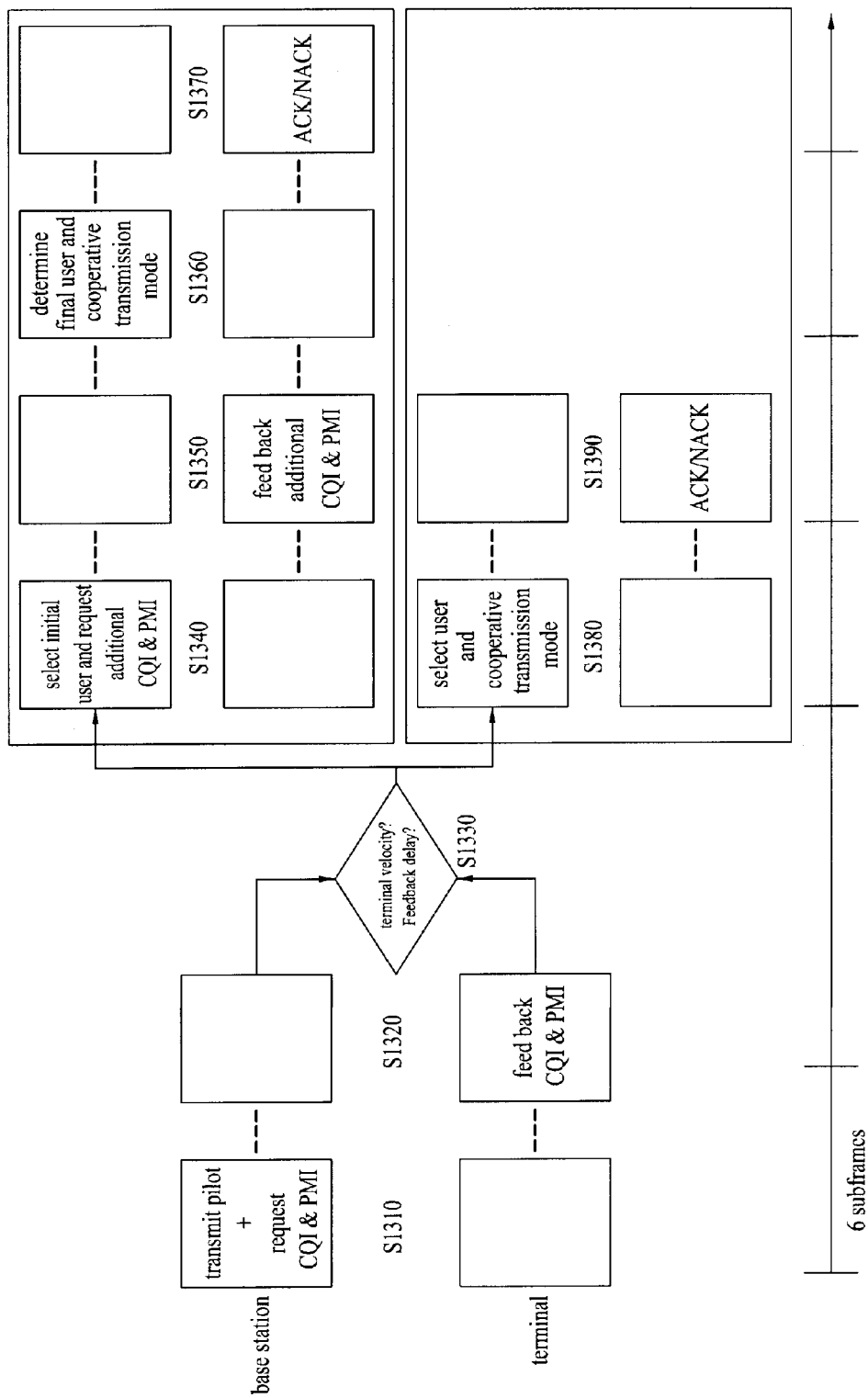
FIG. 13 is a flowchart illustrating a hybrid scheme for adaptive multi-cell cooperative transmission mode selection and radio resource management according to an embodiment of the present invention.

FIG. 13 is a flowchart illustrating a hybrid scheme for adaptive multi-cell cooperative transmission mode selection and radio resource management according to an embodiment of the present invention. The hybrid scheme may include step S1330 of determining whether to perform additional channel information feedback after receiving channel information feedback using a low resolution codebook from a terminal. Here, the additional channel information feedback corresponds to step S1230 of FIG. 12, in which the BS selects the initial cooperative terminals (candidate terminals) and requests channel information feedback using a high resolution codebook, and the following step. Step S1330 of determining whether to perform the additional channel information feedback may take factors such as a terminal velocity, feedback delay between a BS and a terminal, etc., which may vary according to actual communication environment, into consideration.

Referring to FIG. 13, steps S1310 in which a BS transmits a pilot signal to terminals and requests the terminals to feed back CQIs and PMIs and step S1320 in which the terminals feed back the CQIs and PMIs at the request of the BS correspond to steps S1210 and S1220 of FIG. 12, and thus description thereof is omitted.

In S1330, the BS checks if a moving velocity of each terminal is greater than a predetermined critical value or if feedback delay is greater than a predetermined critical value on the basis of feedback information from each terminal. When the moving velocity of each terminal is greater than the predetermined critical value or the feedback delay is greater than the predetermined critical value, the BS can directly select final cooperative terminals and a final cooperative transmission mode and transmit data to the terminal (S1380 and S1390).

On the other hand, when the moving velocity of each terminal is lower than the predetermined critical value and the feedback delay is lower than the predetermined critical value, the BS selects initial cooperative terminals and requests additional channel information feedback (S1340). Each terminal transmits additional channel information feedback (S1350). The BS selects final cooperative terminals and a final cooperative transmission mode and transmits data to the corresponding cooperative terminals (S1360). The cooperative terminals transmit acknowledgement (ACK/NACK) signals for the received data to the BS (S1370). Operations of the BS and terminal according to S1340 to S1370 correspond to S1230 to S1260 of FIG. 12, and thus description thereof is omitted.

Performances of adaptive multi-cell cooperative transmission mode selection and radio resource management according to an embodiment of the present invention are described with reference to FIGS. 14 to 17. Simulations relating to FIGS. 14 to 17 were performed on the assumption that a multi-cellular network includes three BSs, each cell has a radius of 1 km, terminals are randomly distributed in proportion to the area of each cell, ten terminals are present per BS, each BS includes two antennas, and each terminal includes a single antenna. A simple channel model having a path attenuation coefficient of 4 and considering Rayleigh fading was used for the simulations.

Figure 14:
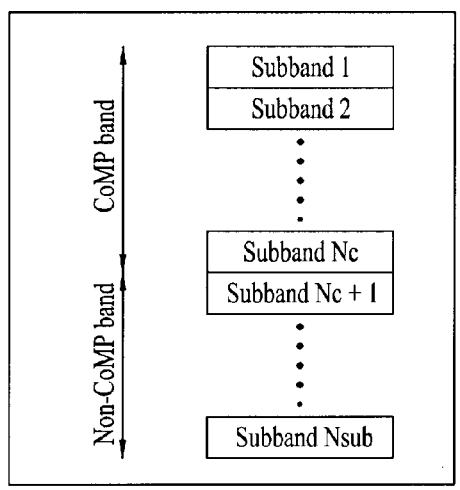
FIG. 14 shows a subband structure used for cooperative terminals and non-cooperative terminals used for simulations of FIGS. 15 to 17.

FIG. 14 shows a subband structure for cooperative terminals and non-cooperative terminals, used for the simulations. When a total number of subbands that can be used by terminals in the system is Nsub, cooperative terminals can use Nc subbands and non-cooperative terminals can use Nsub-Nc subbands. For example, Nsub can be 10 and Nc can be 5. That is, the total number of subbands that can be used by terminals is 10, five of the 10 subbands can be used for the cooperative terminals, and the remaining five can be used for the non-cooperative terminals.

Figure 15:
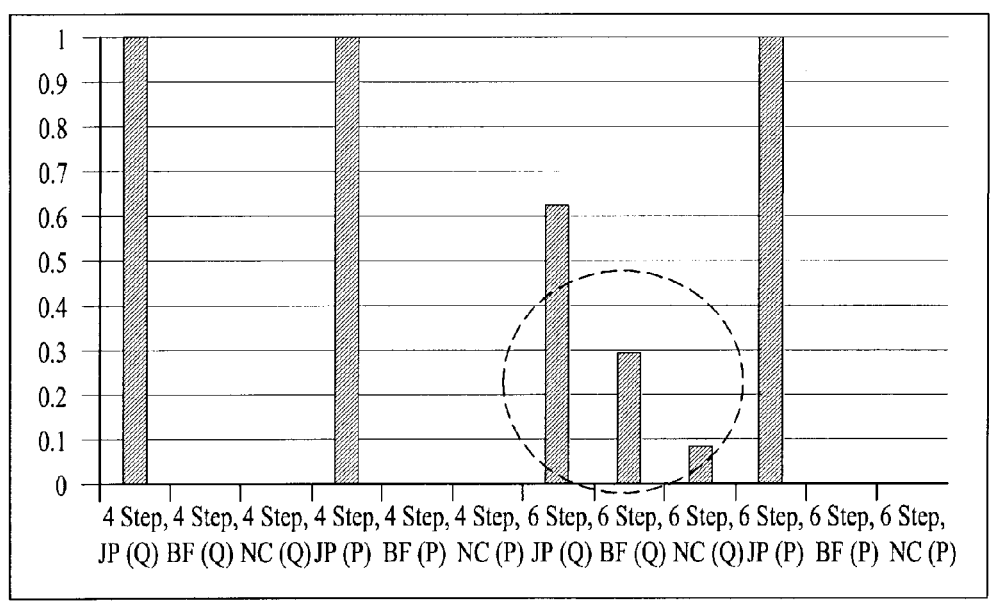
FIGS. 15 to 17 show results of simulations for adaptive multi-cell cooperative transmission mode selection and radio resource management schemes according to an embodiment of the present invention.
Figure 16:
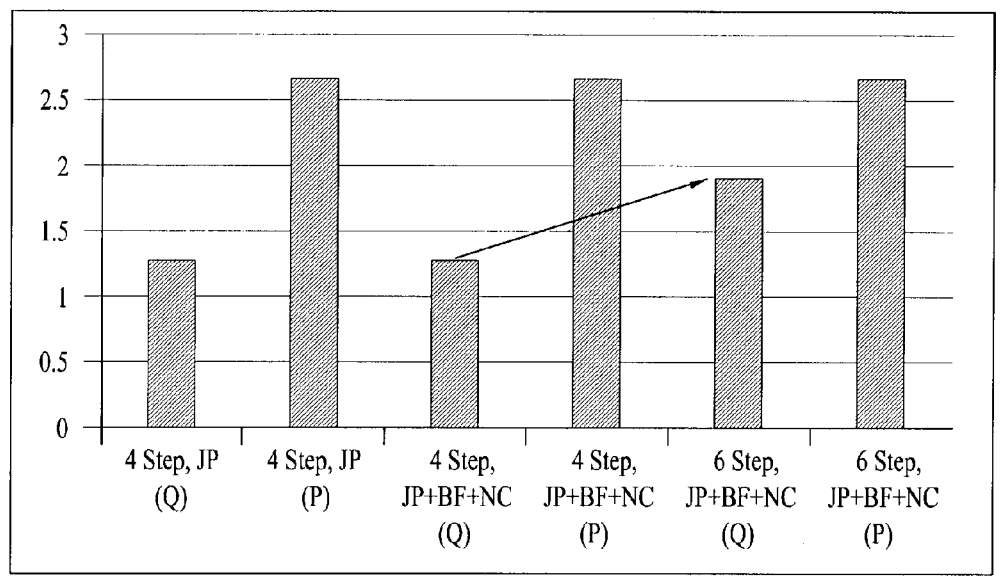
Figure 17:
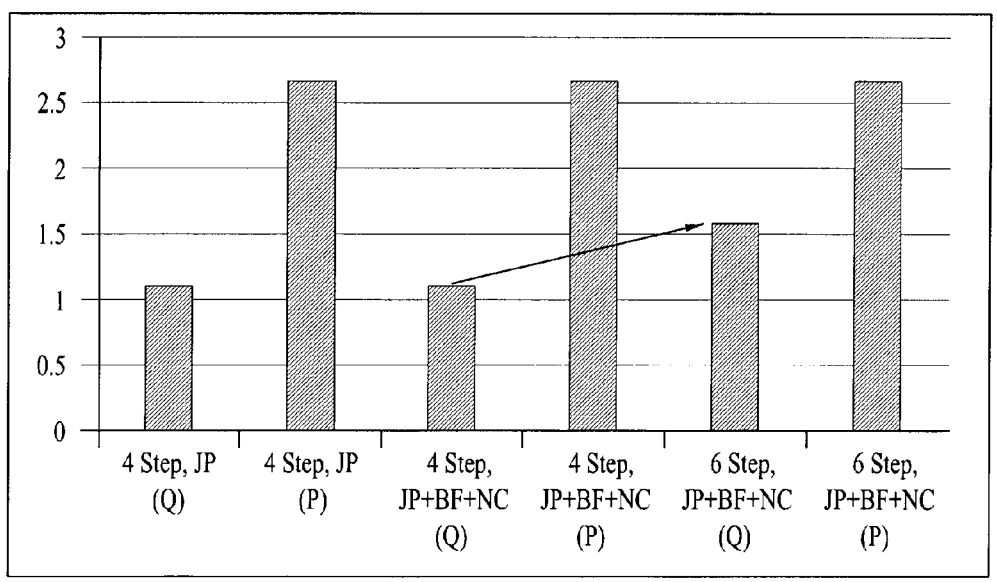

FIGS. 15 to 17 show simulation results that exhibit performances of adaptive multi-cell cooperative transmission mode selection and radio resource management according to an embodiment of the present invention.

Specifically, FIGS. 15 to 17 show simulation results for the scheme of selecting initial cooperative terminals according to channel information feedback using a low level codebook and selecting final cooperative terminals and a cooperative transmission scheme according to channel information feedback using a high level codebook, received from the selected initial cooperative terminals (referred to as a 6-step scheme as in FIG. 12) as described in the above embodiments, and the scheme of directly selecting final cooperative terminals and a cooperative communication scheme without selecting initial cooperative terminals and without channel information feedback using a high level codebook (referred to as a 4-step scheme). It is assumed that the 4-step scheme uses 4 quantization bits per channel and 3 subbands per terminal and the 6-step scheme uses 3 bits for low level codebook channel information to select 4 subbands ($M_{CoMP}=4$, $M_{Non-CoMP}=3$). In addition, it is assumed that 3 bits are used for high level codebook channel information, each frame corresponds to 7 OFDM symbols having 1024 subcarriers, and 10 MHz is considered. In FIGS. 15 to 17, (Q) represents a simulation result on the assumption that a BS uses quantized channel information received from a terminal, and (P) represents a simulation result on the assumption that channel information is perfect. The effectiveness of the present invention can be confirmed by comparing simulation results of (Q) and (P) if all other conditions are equal.

FIG. 15 shows a simulation result representing a ratio of selecting each cooperative transmission mode in the 4-step scheme and the 6-step scheme.

Referring to FIG. 15, when a CoMP process is performed according to the 4-step scheme, JP is selected as a cooperative transmission mode from many transmission modes in most cases because channel estimation performance of JC is superior to those of BF and NC. As can be seen from the simulation result, JP is determined as a cooperative transmission mode for all cases using the 4-step scheme. However, although more satisfactory performance can be achieved according to BF or NC rather than JP according to system environment (e.g. large backhaul retardation, high terminal velocity, large channel feedback delay, etc.), as described above, system performance may be deteriorated by using the 4-step scheme since JP is generally determined as a cooperative transmission scheme for the 4-step scheme. To solve this problem, the 6-step scheme proposed by the present invention can be used to adaptively determine a more suitable cooperative transmission mode from JP, BF and NC, to thereby maintain system performance.

FIGS. 16 and 17 show simulation results exhibiting the sum of average transmission rates of cooperative terminals when the terminals have moving velocities of 10 km/h and 80 km/h. As indicated by arrows in FIGS. 16 and 17, the sum of average transmission rates of the cooperative terminals increases in the case of the 6-step scheme as compared to the 4-step scheme. Comparing the simulation results according to the 6-step scheme proposed by the present invention, shown in FIGS. 16 and 17, it can be seen that it is possible to obtain a larger performance gain when the terminal velocity is low (FIG. 16) than when the terminal velocity is high (FIG. 17). That is, the simulation result of FIG. 16 exhibits a performance gain of approximately 47% when the terminal velocity is 10 km/h, whereas the simulation result of FIG. 17 exhibits a performance gain of approximately 33% when the terminal velocity is 80 km/h. This is because the 6-step scheme proposed by the present invention is greatly affected by channel variation due to user movement, as compared to the 4-step scheme and thus performance attenuation of the 6-step scheme becomes severer than that of the 4-step scheme as the terminal velocity increases. However, it is apparent that the 6-step scheme proposed by the present invention can achieve higher performance gain than the 4-step scheme even when the terminal velocity is high.

While JP, BF and NC are exemplified as cooperative communication schemes in the above embodiments of the present invention, the present invention is not limited thereto and various cooperative communication schemes other than JP, BF and NC are applicable to the present invention.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The above-described embodiments of the present invention can be applied to various mobile communication systems.

The invention claimed is:

1. A method of adaptively feeding back, by a terminal, channel information relating to multi-cell cooperative communication, the method comprising:
    measuring average signal-to-noise ratio of virtual multi-antenna channels between the terminal and one or more cell, the average signal-to-noise ratio being transmitted to a base station;
    receiving, from the base station, a number of allowable feedback bits and cooperative communication information determined on the basis of the average signal-to-noise ratio;
    selecting a codebook from a plurality of predetermined codebooks on the basis of the number of allowable feedback bits and the cooperative communication information; and
    quantizing channel information on the virtual multi-antenna channels using the selected codebook, and transmitting feedback information including the quantized channel information to the base station,
    wherein the codebook is selected to transmit the feedback information using the entire number of allowable feedback bits.

2. The method according to claim 1, wherein the selecting of the codebook comprises selecting a low resolution codebook when the number of cells relating to the channel information is large and selecting a high resolution codebook when the number of cells relating to the channel information is small.

3. The method according to claim 1, wherein the cooperative communication information includes information on a cooperative unit and an allowable cooperative communication scheme.

4. The method according to claim 1, wherein the codebook is configured such that quantized channel information about a lower cooperative communication scheme is acquired from quantized channel information about a higher cooperative communication scheme.

5. The method according to claim 1, wherein the channel information on the virtual multi-antenna channels between the terminal and one or more cells is simultaneously quantized.

6. The method according to claim 1, wherein the feedback information includes a codebook indicator.

7. A method for adaptively determining, by a base station, a multi-cell cooperative communication scheme, the method comprising:
    receiving average signal-to-noise ratio of virtual multi-antenna channels between a terminal and one or more cells from the terminal;
    determining a number of allowable feedback bits and cooperative communication information on the basis of the average signal-to-noise ratio;
    receiving feedback information on the virtual multi-antenna channels from the terminal; and
    determining a cooperative communication scheme on the basis of the feedback information,
    wherein the feedback information includes channel information on the virtual multi-antenna channels, which is quantized using a codebook selected from a plurality of predetermined codebooks on the basis of the number of allowable feedback bits and the cooperative communication information,
    wherein the codebook is selected to transmit the feedback information using the entire number of allowable feedback bits.

8. The method according to claim 7, wherein the codebook is selected in such a manner that a low resolution codebook is selected when the number of cells relating to the channel information is large and a high resolution codebook is selected when the number of cells relating to the channel information is small.

9. The method according to claim 7, wherein the cooperative communication information includes information on a cooperative unit and an allowable cooperative communication scheme.

10. The method according to claim 7, wherein the codebook is configured such that quantized channel information about a lower cooperative communication scheme is acquired from quantized channel information about a higher cooperative communication scheme.

11. The method according to claim 7, wherein the channel information on the virtual multi-antenna channels between the terminal and one or more cells is simultaneously quantized.

12. The method according to claim 7, wherein the feedback information includes a codebook indicator.

13. The method according to claim 7, wherein the determining of the cooperative communication scheme comprises determining the cooperative communication scheme by sharing the feedback information with other base stations in a cooperative unit.

14. A terminal for adaptively feeding back channel information relating to multi-cell cooperative communication, the terminal comprising:
    a reception module for receiving a downlink signal from a base station;
    a transmission module for transmitting an uplink signal to the base station; and
    a processor for controlling the terminal including the reception module and the transmission module,
    wherein the processor is configured to receive, from the base station, a number of allowable feedback bits and cooperative communication information through the reception module, to select a codebook from a plurality of predetermined codebooks on the basis of the number of allowable feedback bits and the cooperative communication information, to quantize channel information on virtual multi-antenna channels between the terminal and one or more cells using the selected codebook, and to transmit feedback information including the quantized channel information to the base station, wherein the codebook is selected to transmit the feedback information using the entire number of allowable feedback bits.

15. A base station for adaptively determining a multi-cell cooperative communication scheme, the base station comprising:

a reception module for receiving an uplink signal from a terminal;

a transmission module for transmitting a downlink signal to the terminal; and a processor for controlling the base station including the reception module and the transmission module, wherein the processor is configured to receive, from the terminal, average signal-to-noise ratio of virtual multi-antenna channels between the terminal and one or more cell through the reception module, to determine a number of allowable feedback bits and cooperative communication information on the basis of the average signal-to-noise ratio, to transmit the number of allowable feedback bits and cooperative communication information to the terminal through the transmission module, to receive feedback information on the virtual multi-antenna channels from the terminal through the reception module, and to determine a cooperative communication scheme on the basis of the feedback information, wherein the feedback information includes channel information on the virtual multi-antenna channels, which is quantized using a codebook selected from a plurality of predetermined codebooks on the basis of the number of allowable feedback bits and the cooperative communication information, wherein the codebook is selected to transmit the feedback information using the entire number of allowable feedback bits.

* * * * *